United States Patent
Lee et al.

(10) Patent No.: US 10,523,859 B2
(45) Date of Patent: Dec. 31, 2019

(54) PORTABLE CAMERA AND CONTROLLING METHOD THEREOF

(71) Applicant: LG Electronics Inc., Seoul (KR)

(72) Inventors: Seunghyun Lee, Seoul (KR); Sangrae Kim, Seoul (KR); Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 15/685,461

(22) Filed: Aug. 24, 2017

(65) Prior Publication Data

US 2018/0077335 A1    Mar. 15, 2018

(30) Foreign Application Priority Data

Sep. 9, 2016 (KR) .................. 10-2016-0116344

(51) Int. Cl.
*H04N 5/232* (2006.01)
*G06T 7/70* (2017.01)

(52) U.S. Cl.
CPC ........... *H04N 5/23206* (2013.01); *G06T 7/70* (2017.01); *H04N 5/23296* (2013.01)

(58) Field of Classification Search
CPC ... H04N 5/23206; H04N 5/23296; G06T 7/70
USPC ........................................................ 348/158
See application file for complete search history.

(56) References Cited

U.S. PATENT DOCUMENTS

| | | | |
|---|---|---|---|
| 6,731,334 B1 | 5/2004 | Maeng et al. | |
| 8,781,397 B2 | 7/2014 | Sole | |
| 2012/0257064 A1 | 10/2012 | Kim et al. | |
| 2014/0206288 A1 | 7/2014 | Liu et al. | |
| 2015/0237252 A1* | 8/2015 | O'Donnell | G08C 17/02 348/158 |
| 2018/0314251 A1* | 11/2018 | Kamalakantha | G08C 17/00 |

OTHER PUBLICATIONS

International Search Report in International Application No. PCT/KR2017/008156, dated Dec. 1, 2017, 10 pages (with English translation).

\* cited by examiner

*Primary Examiner* — Jared Walker
(74) *Attorney, Agent, or Firm* — Fish & Richardson P.C.

(57) ABSTRACT

Disclosed are a portable camera and controlling method thereof. The present invention includes a communication unit, an imaging unit configured to take an image, and a controller configured to control the communication unit to connect a communication with a first external device satisfying a preset condition, control a movement of the imaging unit to take a shot for a first object corresponding to the first external device, and control the communication unit to send an image of taking the shot for the first object to the first external device.

20 Claims, 20 Drawing Sheets

(a)

PORTABLE CAMERA AND CONTROLLING METHOD THEREOF

Pursuant to 35 U.S.C. § 119(a), this application claims the benefit of earlier filing date and right of priority to Korean Patent Application No. 10-2016-0116344, filed on Sep. 9, 2016, the contents of which are hereby incorporated by reference herein in their entirety.

BACKGROUND OF THE INVENTION

Field of the Invention

The present invention relates to a portable camera, and more particularly, to a portable camera and controlling method thereof.

Discussion of the Related Art

Regarding a general portable camera, in order to take a shot for a specific subject, a user should take a shot for the specific subject by manipulating the camera in direct.

The general portable camera fails to have a function of taking a shot in a manner of recognizing an external device satisfying a preset condition, connecting a communication with the external device satisfying the preset condition, and then tracking a movement of a user of the communication connected external device.

The general portable camera fails to have a function of taking a shot in a manner of connecting communications with a plurality of external devices, recognizing an external device satisfying a specific condition among a plurality of the external devices, and then tracking a user of the recognized external device only.

If the external device satisfying the specific condition among a plurality of the external devices is changed, it is inconvenient for a user to directly manipulate the portable camera in order to take a shot by tracking a user of the changed external device.

Thus, the demand for developing a portable camera and controlling method thereof to solve the problems of the portable camera of the related art is increasingly rising.

SUMMARY OF THE INVENTION

Accordingly, embodiments of the present invention are directed to a portable camera and controlling method thereof that substantially obviate one or more problems due to limitations and disadvantages of the related art.

One object of the present invention is to provide a portable camera and controlling method thereof, by which a shot can be taken in a manner of connecting a communication with an external device satisfying the preset condition and then tracking a movement of a user of the communication connected external device.

Another object of the present invention is to provide a portable camera and controlling method thereof, by which if communications with a plurality of external devices are connected, a shot is taken in a manner of recognizing an external device satisfying a specific condition among a plurality of the external devices and then tracking a user of the recognized external device only.

Further object of the present invention is to provide a portable camera and controlling method thereof, by which if the external device satisfying the specific condition among a plurality of the external devices is changed, a shot is taken in a manner of tracking a user of the changed external device.

Another further object of the present invention is to provide a portable camera and controlling method thereof, by which an image containing an object satisfying a preset condition is automatically transmitted to an external device corresponding to the object.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a portable camera according to one embodiment of the present invention may include a communication unit, an imaging unit configured to take an image, and a controller configured to control the communication unit to connect a communication with a first external device satisfying a preset condition, control a movement of the imaging unit to take a shot for a first object corresponding to the first external device, and control the communication unit to send an image of taking the shot for the first object to the first external device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Accordingly, embodiments of the present invention provide various effects and/or features.

According to at least one of embodiments of the present invention, a shot can be taken in a manner of connecting a communication with an external device satisfying the preset condition and then tracking a movement of a user of the communication connected external device.

According to at least one of embodiments of the present invention, if communications with a plurality of external devices are connected, a shot can be taken in a manner of recognizing an external device satisfying a specific condition among a plurality of the external devices and then tracking a user of the recognized external device only.

According to at least one of embodiments of the present invention, if the external device satisfying the specific condition among a plurality of the external devices is changed, a shot can be taken in a manner of tracking a user of the changed external device.

According to at least one of embodiments of the present invention, an image containing an object satisfying a preset condition can be automatically transmitted to an external device corresponding to the object.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
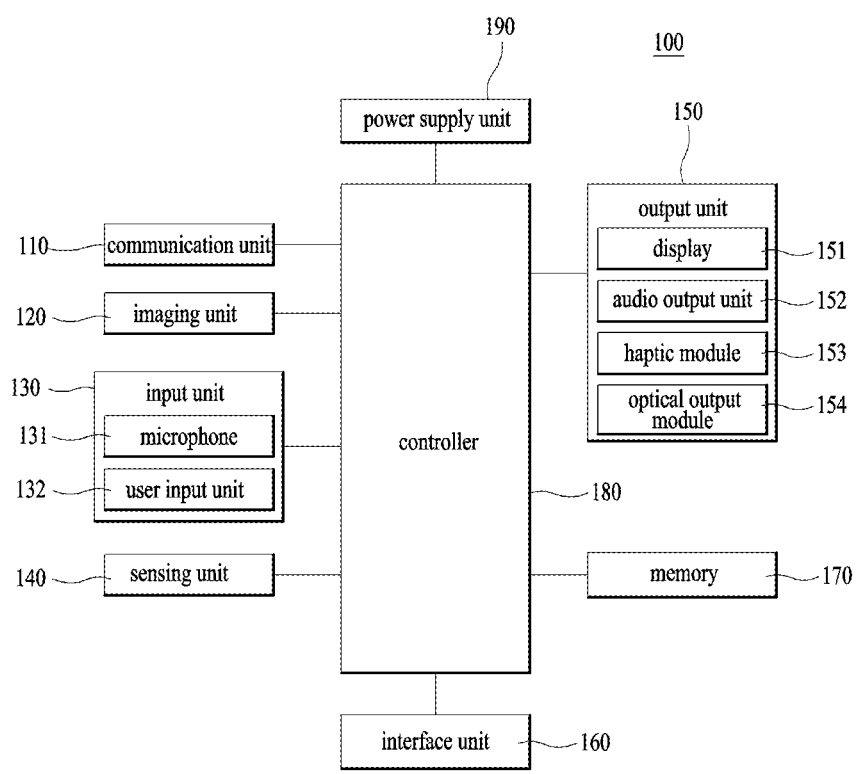
FIG. 1 is a block diagram to describe a portable camera related to the present invention.

FIG. 1 is a block diagram to describe a portable camera related to the present invention.

A portable camera 100 may include a communication unit 110, an imaging unit 120, an input unit 130, a sensing unit 140, an output unit 150, an interface unit 160, a memory 170, a controller 180, a power supply unit 190, etc. It is understood that implementing all of the components shown in FIG. 1 is not a requirement for the portable camera, and that greater or fewer components may alternatively be implemented for the portable camera.

Particularly, the communication unit 110 typically includes one or more modules which permit communications such as wireless communications between the portable camera 100 and a wireless communication system, communications between the portable camera 100 and another portable camera, communications between the portable camera 100 and an external server, and the like. Further, the communication unit 110 typically includes one or more modules which connect the portable camera 100 to one or more networks.

The communication unit 110 may include one or more of a mobile communication module, a wireless Internet module, a short-range communication module, and a location information module.

The imaging unit 120 may include one or more cameras. The imaging unit 120 processes video frames of still or moving images obtained by an image sensor in shot mode. The processed video frames may be displayed on the display unit 151 or saved to the memory 170. The processed video frame may be transmitted to a communication connected external device. A plurality of the cameras provided to the portable camera 100 may be disposed to configure a matrix structure. Thus, using the cameras configuring the matrix structure, a plurality of image informations having various angles and focuses can be inputted to the portable camera 100. Moreover, in order to obtain right and left images to embody a stereoscopic image, a plurality of the cameras may be disposed in a stereo structure.

The imaging unit 120 may move under the control of the controller 180. A method of controlling a movement of the imaging unit 120 shall be described in detail with reference to FIGS. 3A, 3B and 3C later.

The imaging unit 120 may include a plurality of lenses arrayed along at least one line. A plurality of the lenses may be arrayed in a matrix form. And, such a camera may be named 'array camera'. If the camera is configured with the array camera, images can be taken in various ways using a plurality of lenses and an image of a better quality can be obtained.

The input unit 130 may include a microphone or an audio input unit for an audio signal input and a user input unit 132 (e.g., a touch key, a push key, a mechanical key, etc.) configured to receive an input of information from a user. The input unit 130 may analyze a collected audio data or a signal inputted through the user input unit and then process it into a user's control command.

The sensing unit 140 is typically implemented using one or more sensors configured to sense at least one of internal information of the portable camera 100, the surrounding environment of the portable camera 100, user information, and the like. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.), to name a few. The portable camera 100 disclosed in the present specification may be configured to utilize information obtained from sensing unit 140, and in particular, information obtained from one or more sensors of the sensing unit 140, and combinations thereof.

The output unit 150 is typically configured to generate outputs related to optical sensation, auditory sensation, tactile sensation, and the like. The output unit 150 may include at least one of a display unit 151, an audio output unit 152, a haptic module 153, and an optical output unit 154. The display unit 151 may have an inter-layered structure or an integrated structure with a touch sensor in order to facilitate a touchscreen. The touchscreen may provide an output interface between the portable camera 100 and a user, as well as function as the user input unit 132 which provides an input interface between the portable camera 100 and the user.

The interface unit 160 serves as an interface with various types of external devices that can be coupled to the portable camera 100. The interface unit 160, for example, may include at least one of wired or wireless ports, external power supply ports, wired or wireless data ports, memory card ports, ports for connecting a device having an identification module, audio input/output (I/O) ports, video input/output (I/O) ports, earphone ports, and the like. The portable camera 100 may perform assorted control functions associated with a connected external device, in response to a case that the external device is connected to the interface unit 160.

The memory 170 is typically implemented to store data to support various functions or features of the portable camera 100. The memory 170 may be configured to store a multitude of application programs or applications run in the portable camera 100, data and commands (or instructions) for operations of the portable camera 100, and the like. At least one portion of these application programs may be downloaded from an external server via wireless communication. At least one portion of the application programs may be installed on the portable camera 100 at time of manufacturing or shipping, which is typically the case for basic functions of the portable camera 100 (e.g., incoming/outgoing call function, message receiving/sending function, etc.). It is common for application programs to be stored in the memory 170, installed on the portable camera 100, and launched by the controller 180 to perform operations (or functions) of the portable camera 100.

The controller 180 typically functions to control overall operations of the portable camera 100, in addition to the operations associated with the application programs. The controller 180 may process or provide appropriate information or function to a user by processing signals, data, information and the like inputted or outputted through the above-mentioned components or running application programs stored in the memory 170.

In order to run the application program stored in the memory 170, the controller 180 may control at least one portion of the components described with reference to FIG. 1. Furthermore, in order to run the application program, the controller 180 may combine to enable at least two of the components included in the portable camera 100.

The power supply unit 190 may receive external power or internal power in order to supply appropriate power required for operating elements and components included in the portable camera 100 under the control of the controller 180. The power supply unit 190 may include a battery, and the battery may include an embedded battery, a replaceable battery, or the like.

At least one portion of the above-mentioned components can cooperatively operate to implement operations, controls or controlling methods of the portable camera 100 according to various embodiments mentioned in the following description. And, the operations, controls or controlling methods of the portable camera 100 can be implemented on the portable camera 100 by running at least one or more application programs stored in the memory 170.

In the following description, prior to looking into various embodiments implemented through the above-described portable camera 100, the above-listed components are described in detail with reference to FIG. 1.

First of all, the mobile communication module included in the communication unit 110 may transceive wireless signals with at least one of a base station, an external mobile terminal, a server, and the like on a mobile communication network established according to technical standards or communication systems for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), etc.).

The wireless signals may include various types of data.

The wireless Internet module included in the communication unit 110 is configured to facilitate wireless Internet access. This module may be internally or externally coupled to the portable camera 100. The wireless Internet module may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced) and the like. The wireless Internet module may transmit/receive data according to one or more of such wireless Internet technologies, and other Internet technologies as well.

In aspect that the wireless Internet access is implemented according to WiBro, HSDPA, HSUPA, GSM, CDMA, WCDMA, LTE, LTE-A or the like through a mobile communication network, the wireless Internet module configured to perform such wireless Internet access through the mobile communication network may be understood as a sort of the mobile communication module.

The short-range communication module included in the communication unit 110 is configured to facilitate short-range communications and support the short-range communications using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus) and the like. The short-range communication module in general supports wireless communications between the portable camera 100 and a wireless communication system, communications between the portable camera 100 and another portable camera 100, communications between the portable camera 100 and another external device, or communications between the portable camera 100 and a network where another portable camera 100 (or an external server) is located, via wireless area networks. The wireless area networks may include wireless personal area networks.

In some embodiments, the communication unit may be configured to mutually exchange data with another external device. Herein, another external device may include a wearable device (e.g., a smart watch, a smart glass or a head mounted display (HMD)), which is able to exchange data with the portable camera 100 according to the present invention. The short-range communication module may sense or recognize the wearable device, and permit communication between the wearable device and the portable camera 100. In addition, when the sensed wearable device is a device which is authenticated to communicate with the portable camera 100 of the present invention, the controller 180 transmit data processed in the portable camera 100 to the wearable device via the short-range communication module. Hence, a user of the wearable device may use the data processed in the portable camera 100 through the wearable device. For example, according to this, the user can control a movement of the portable camera 100 using the wearable device.

The location information module included in the communication module 110 is generally configured to obtain a location (or, a current location) of the portable camera. As a representative example, the location information module may include a Global Position System (GPS) module or a Wi-Fi module. For instance, if utilizing the GPS module, the portable camera may obtain a location of the portable camera using signals sent by a GPS satellite. For another instance, if utilizing the Wi-Fi module, the portable camera may obtain a location of the portable camera based on information of a wireless access point (AP) transceiving wireless signals with the Wi-Fi module. If desired, the location information module may alternatively or additionally function with any of the other modules of the communication unit 110 to obtain data related to the location of the portable camera. The location information module is the module used to obtain a location (or a current location) of the portable camera, and may be non-limited to a module configured to directly calculate or obtain a location of the portable camera.

The input unit 120 may be configured for an input of audio information (or signal), data or information inputted from a user. For an input of image or video information, the microphone 131 processes an external sound signal into an electrical audio data. The processes audio data may be utilized in various ways according to a function currently executed (or an application program currently run) in the portable camera 100. If desired, assorted noise cancellation algorithms to cancel noise generated in the course of receiving an external sound signal may be implemented in the microphone 131.

The microphone 131 is configured to receive inputs of user's voice, other sound and the like. The microphone 131 may be configured to receive inputs of stereo sound by being provided to a plurality of places.

The user input unit 132 is configured to receive an input of information from a user. If information is inputted through the user input unit 132, the controller 180 may control operation of the portable camera 100 to correspond to the inputted information. The user input unit 132 may include one or more of a mechanical input means (e.g., a mechanical key, a dome switch, a jog wheel, a jog switch, etc.) and a touch-sensitive input means. As one example, the touch-sensitive input means may include one of a virtual key, a soft key and a visual key, each of which is displayed on a touchscreen through software processing, or a touch key disposed on a portion other than the touchscreen. On the other hand, the virtual key or the visual key may be displayed on the touchscreen in various shapes, for example, graphic, text, icon, video, or a combination thereof.

The sensing unit 140 is generally configured to sense one or more of internal information of the portable camera, surrounding environment information of the portable camera, and user information, and generate a corresponding sensing signal. Based on such a sensing signal, the controller 180 may control activation or operation of the portable camera 100 or perform a data processing, function or operation related to an application program installed on the portable camera 100. Representative sensors among various sensors inclusive in the sensing unit 140 are described in detail as follows.

First of all, a proximity sensor may mean a sensor configured to sense a presence or absence of an object approaching a prescribed detection surface or an object located in the vicinity using a force of an electromagnetic field, infrared rays, or the like without a mechanical contact. The proximity sensor may be disposed in an internal region of the portable camera enclosed by the aforementioned touchscreen or near the touchscreen.

The proximity sensor, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor may be configured to sense proximity of an object using variation of an electric field attributed to proximity of the object having conductivity. In this case, the touchscreen (or a touch sensor) may be also categorized as a proximity sensor.

For clarity of description, the term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is vertical to the touchscreen. The proximity sensor may sense proximity touch, and proximity touch patterns (for example, proximity touch distance, proximity touch direction, proximity touch speed, proximity touch time, proximity touch position, proximity touch moving state, etc.). Meanwhile, the controller 180 processes data corresponding to proximity touches and proximity touch patterns sensed by the proximity sensor, and outputs visual information corresponding to the processed data to the touchscreen. In addition, the controller 180 can control the portable camera 100 to process different operations or data (or information) depending on whether a touch with respect to a same point on the touchscreen is a proximity touch or a contact touch.

A touch sensor can sense a touch (or a touch input) applied to the touchscreen (or the display unit 151) using at least one of a variety of touch methods. Examples of such touch methods include a resistive type, a capacitive type, an infrared type, and a magnetic field type, among others.

As one example, the touch sensor may be configured to convert a variation of a pressure applied to a specific part of the touchscreen or a variation of capacitance generated from a specific part of the touchscreen into an electrical input signal. The touch sensor may be also configured to sense a location, area, pressure and capacitance of a touch applied to the touch sensor on the touchscreen with a touch object and the like. Herein, the touch object is an object used to apply a touch input to the touch sensor. Examples of typical touch objects include a finger, a touch pen, a stylus pen, a pointer, and the like.

Thus, when a touch input is sensed by a touch sensor, corresponding signals may be transmitted to a touch controller. The touch controller may process the received signals, and then transmit corresponding data to the controller 180. Hence, the controller 180 may recognize which region of the display unit 151 has been touched, and the like. Herein, the touch controller may include a component separate from the controller 180, the controller 180, or combinations thereof.

In some embodiments, the controller 180 may perform a same or different control according to a type of a touch object that touches the touchscreen (or a touch key provided in addition to the touchscreen). Whether to perform the same or different control according to a type of the object may be determined based on a current operating state of the portable camera 100 or a currently run application program.

The touch sensor and the proximity sensor may be implemented individually, or in combination, to sense various types of touches. Such touches to the touchscreen may include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information of a sensing target using ultrasonic waves. The controller 180, for example, may calculate a location of a wave generation source based on information sensed by an optical sensor and a plurality of ultrasonic sensors. Since light is much faster than ultrasonic waves, a time taken for the light to reach the optical sensor is much shorter than a time taken for the ultrasonic wave to reach the ultrasonic sensor. Thus, the location of the wave generation source may be calculated using this fact. In particular, the location of the wave generation source may be calculated using a time difference from a time taken for the ultrasonic wave to reach the sensor based on the light as a reference signal.

Meanwhile, the imaging unit 120 described as the configuration of the input unit 130 may typically include at least one a camera sensor (e.g., CCD, CMOS etc.), a photo sensor (or an image sensor), and a laser sensor.

The display unit 151 is generally configured to display (or output) information processed in the portable camera 100. For example, the display unit 151 may display a running screen information of an application program running in the portable camera 100 or a user interface/graphic user interface (UI/GUI) information according to the running screen information. Yet, according to an embodiment of the present invention, the portable camera 100 may not include the display unit 151.

The audio output unit 152 is generally configured to output audio data, which is received from the communication unit 110 or stored in the memory 170, when an image or video shot is taken through the imaging unit 120. The audio output unit 152 may output an audio signal related to a function executed in the portable camera 100. The audio output unit 152 may include a receiver, a speaker, a buzzer, and the like.

The audio output unit 152 may be embodied into a loud speaker for outputting various alarm sounds or multimedia play sounds.

The haptic module 153 can be configured to generate various tactile effects that a user can feel, perceive, or otherwise experience. A typical example of a tactile effect generated by the haptic module 153 is vibration. The strength, pattern and the like of the vibration generated by the haptic module 153 can be controlled by user's selection or controller's settings. For example, the haptic module 153 may output different vibrations in a combining manner or a sequential manner.

Besides vibration, the haptic module 153 can generate various other tactile effects, including an effect by stimulation such as a pin arrangement configured to move vertically against a contact skin surface, a spray/suction force of air through a nozzle/intake, a brush with a skin surface, a contact with an electrode, an electrostatic force, an effect by reproducing a cold/warm sense using an endothermic/exothermic device, and the like.

The haptic module 153 may be embodied to transfer a haptic effect through a direct contact and enable a user to feel a tactile effect through a muscle sensation of a finger, an arm or the like. Two or more haptic modules 153 may be provided according to the particular configuration of the portable camera 100.

The optical output unit 154 can output a signal for indicating an event occurrence using light. Examples of events occurring in the portable camera 100 may include a communication connection with an external device, a movement control of the imaging unit 120, a video or image shot, and the like.

The optical output unit 154 can output a plurality of lights, which are implemented in such a manner of emitting a monochromatic light or lights with a plurality of colors. The light plays a role in enabling a user to check an event of the portable camera 100.

The interface unit 160 plays a role as a passage to every external device connected to the portable camera 100. The interface unit 160 receives data transmitted from an external device or is supplied with a power, and then transfers the data or power to the respective components in the portable camera 100. And, the interface unit 160 transmits data in the portable camera 100 to an external device. The interface unit 160 may include wired or wireless headset ports, external power supply ports, wired or wireless data ports, memory card ports, ports for connecting to a device having an identification module, audio input/output (I/O) ports, video input/output (I/O) ports, earphone ports, and the like.

Meanwhile, the identification module is a chip that stores various informations for authenticating a use authority of the portable camera 100 and may include a user identity module (UIM), a subscriber identity module (SIM), a universal subscriber identity module (USIM), and the like. A device having the identification module (also referred to herein as an "identifying device") may be manufactured as a smart card. Thus, the identifying device can be connected with the portable camera 100 via the interface unit 160.

When the portable camera 100 is connected with an external cradle, the interface unit 160 can serve as a passage to allow power from the cradle to be supplied to the portable camera 100 or may serve as a passage to allow various command signals, which are inputted by a user from the cradle, to be transferred to the portable camera 100. The various command signals or the power inputted from the cradle may operate as signals for recognizing that the portable camera 100 is properly mounted on the cradle.

The memory 170 may store programs to support operations of the controller 180 and also store input/output data (e.g., image, video, etc.). The memory 170 may store data related to various patterns of vibrations and audios outputted in response to touch inputs to the touchscreen.

The memory 170 may include one or more types of storage mediums such as a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The portable camera 100 may also operate in association with a web storage that performs the storage function of the memory 170 over Internet.

As mentioned in the foregoing description, the controller 180 may typically control the general operations of the portable camera 100. For example, the controller 180 can control a movement of the imaging unit 120 to take a shot for an object corresponding to an external device that satisfies a specific condition.

Moreover, the controller 180 can control one or a combination of those components in order to implement various embodiments disclosed herein on the portable camera 100 according to the present invention.

The power supply unit 190 receives an external or internal and then supplies a power required for an operation of each element or component, under the control of the controller 180. The power supply unit 190 may include a rechargeable built-in battery and be detachably coupled to the portable camera 100 for charging or the like.

The power supply unit 190 may be provided with a connecting port. The connecting port may be configured as one example of the interface unit 160 to which an external charger for supplying power to recharge the battery is electrically connected.

As another example, the power supply unit 190 may be configured to recharge the battery in a wireless manner without using the connecting port. In doing so, the power supply unit 190 can receive power, transferred from an external wireless power transmitter, using at least one of an inductive coupling mechanism based on magnetic induction and a magnetic resonance coupling mechanism based on electromagnetic resonance.

Various embodiments described herein may be implemented in a computer-readable medium, a machine-readable medium, or similar medium using, for example, software, hardware, or any combination thereof.

External Structure of Portable Camera

Figure 2:
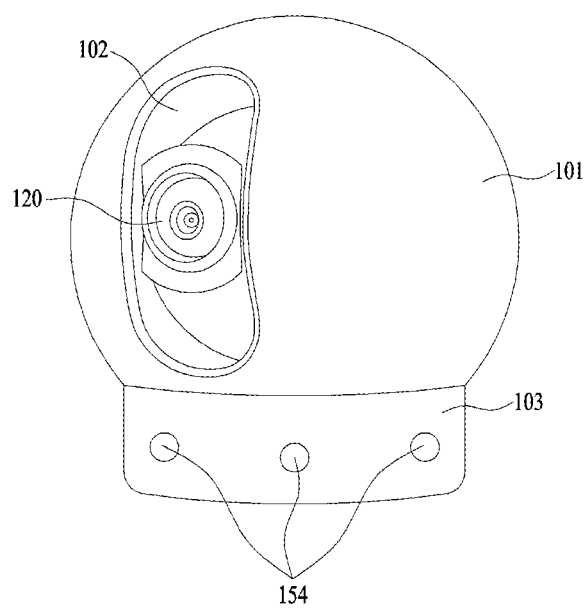
FIG. 2 is front perspective diagram for one example of a portable camera.

FIG. 2 is front perspective diagram for one example of a portable camera.

Referring to FIG. 2, the portable camera 100 may include a housing 101, a support unit 103, an optical output unit 154 and a guide unit 102 at least.

The portable camera 100 may include the housing 101 in a spherical shape. And, the support unit 103 in a cylindrical shape may be coupled with the housing 101. The present invention is non-limited by such shapes and can apply to various shapes or structures.

Various electronic parts may be disposed in an inner space of the spherical housing 101. And, a power unit (not shown) configured to control a movement of the imaging unit 120 may be disposed in the inner space of the housing 101, by which the present invention is non-limited. Various electronic parts configuring the portable camera 100 and a power unit configured to control a movement of the imaging unit 120 may be disposed in the support unit 103.

In some cases, electronic parts may be installed in the housing 101 or the support unit 103. The electronic parts installable in the housing 101 or the support unit 103 may include a detachable battery, a memory card and the like. In this case, a cover may be detachably coupled with the housing 101 or the support unit 103 so as to cover the installed electronic parts. Hence, if the cover is separated from the housing 101 or the support unit 103, the installed electronic parts are externally exposed.

The housing 101 or the support unit 103 may be formed by injection-molding synthetic resin, or may be formed of a metal, for example, stainless steel (STS), aluminum (Al), titanium (Ti), or the like.

The support unit 103 may play a role in supporting the housing 101 by being coupled with a bottom end of the housing 101. The support unit 103 may be detachably coupled with a bottom of the housing 101.

Meanwhile, the housing 101, the imaging unit 120 and the support unit 103 may be provided with a waterproofing unit (not shown) for preventing introduction of water into the portable camera. For example, the waterproofing unit may include a waterproofing member configured to hermetically seal an inner space.

The support unit 103 may include at least one optical output unit 154. The at least one optical output unit 154 may be located on an outer circumference of the support unit 103.

For instance, in case that the portable camera 100 includes a plurality of the optical output units 154, as shown in FIG. 2, a plurality of the optical output units 154 may be disposed at specific locations along the outer circumference of the support unit 103, respectively.

The controller 180 may control light to be discharged from the at least one optical output unit 154 in response to an occurrence of an event.

For instance, the controller 180 can control a specific one of a plurality of the optical output units 154 to discharge light in response to the occurrence of the event.

For another instance, the controller 180 can control a plurality of the optical output units 154 to discharge lights in different colors in response to the occurrence of the event, respectively.

Meanwhile, the housing 101 of the portable camera 100 may include the guide unit 102 configured to guide a motion of the imaging unit 120 so as to enable the imaging unit 120 to move in top and bottom directions without swaying in right and left directions.

Particularly, a hole in an oval shape may be formed in the housing 101. The oval shape may have a length greater than a width. The oval hole may configure the guide unit 120. The imaging unit 120 may be disposed in the guide unit 120. Hence, the imaging unit 120 can move in top and bottom directions without swaying in right and left directions.

A width of the oval shape may be long enough to provide a space for the imaging unit 120 to naturally move in top and bottom directions. Hence, the width may vary according to a size of the imaging unit 120.

The length of the oval shape may be long enough to provide a space for the imaging unit 120 to move at a preset angle (e.g., 20 degrees) in top and bottom directions.

The present invention is non-limited by the above description. The length and width may vary to meet manufacturer's intention. The oval structure may be replaced by other structures. And, the imaging unit 120 may move within the guide unit 102 in right and left directions.

Meanwhile, a flash (not shown) may be disposed adjacent to the imaging unit 120. The flash can illuminate a light toward a subject in case of taking a shot for the subject through the imaging unit 120.

A battery may be disposed in the housing 101 or the support unit 103. The battery may be configured to be supplied with a power though a power cable connected to the interface unit 160. And, the battery may be configured to be chargeable by wireless through a wireless charging device. And, the wireless charging may be implemented by magnetic induction or resonance (e.g., electromagnetic resonance).

Configurations of the portable camera 100 are non-limited by the aforementioned dispositions and configurations. Such configurations may be excluded, replaced, disposed in different planes, or have different forms, if necessary.

Method of Controlling Movement of Imaging Unit

The controller 180 of the portable camera 100 can control a movement of the imaging unit 120. A method of controlling a movement of the imaging unit 120 is described in detail with reference to FIGS. 3A, 3B, and 3C as follows.

Figure 3A:
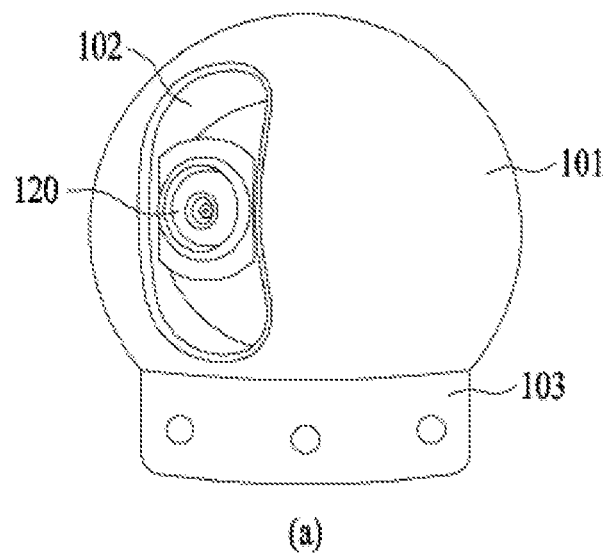
FIGS. 3A, 3B, and 3C are diagrams to describe one example of a method of controlling a movement of an imaging unit in a portable camera according to one embodiment of the present invention.
Figure 3B:
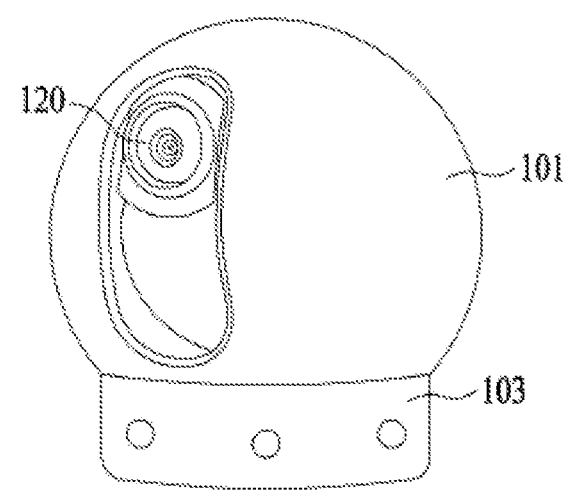
Figure 3C:
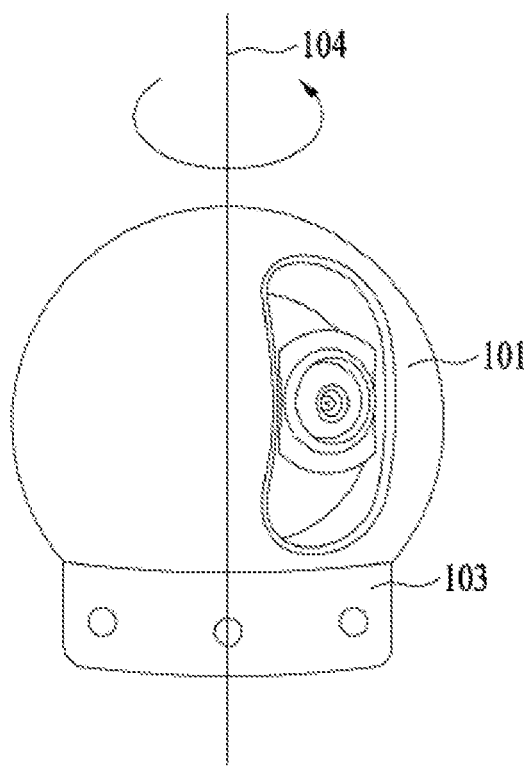

FIGS. 3A, 3B, and 3C are diagrams to describe one example of a method of controlling a movement of an imaging unit in a portable camera according to one embodiment of the present invention.

Referring to FIGS. 3A, 3B, and 3C, the housing 101 of the portable camera 100 may include the guide unit 102 configured to guide a moving direction of the imaging unit 120. A power unit controlling a movement of the imaging unit 120 may be included in the housing 101 or the support unit 103. The controller 180 can control the power unit to move the imaging unit 120 in response to a specific input. And, algorithm for moving the imaging unit 120 may be stored in the memory 170 in advance.

For instance, while the imaging unit 120 is located at a center of the guide unit 102, as shown in FIG. 3A, if a specific input is sensed, as shown in FIG. 3B, the controller 180 can control a movement of the imaging unit 120 so that the imaging unit 120 can face a top direction. In doing so, the guide unit 102 can guide the movement of the imaging unit 120 so that the imaging unit 120 can move in a top direction without moving in right and left directions.

Meanwhile, according to one embodiment of the present invention, the imaging unit 120 may move in right and left directions as well as in top and bottom directions.

According to the present invention, as the housing 101 moves in right and left directions, the imaging unit 120 can move in right and left directions. And, the imaging unit 120 itself may move in right and left directions.

In case that the imaging unit 120 itself moves in right and left directions, the imaging unit 120 can move in right and left directions in a manner similar of moving in top and bottom directions. Hence, its details shall be omitted.

A case that the imaging unit 120 moves in right and left directions in response to a movement of the housing 101 is described as follows.

First of all, the housing 101 can rotate in a horizontal direction centering on a virtual axis 104 under the control of the controller 180. While the imaging unit 120 is fixed within the guide unit 102, since the housing 101 rotates in the horizontal direction centering on the virtual axis 104, the imaging unit 120 eventually moves in right and left directions.

For instance, while the imaging unit 120 is fixed so as to face a first direction, as shown in FIG. 3A, the controller 180 can control a movement of the housing 101 to rotate. The controller 180 may control a movement of the housing 101 so that the housing 101 can rotate in a horizontal direction centering on the virtual axis 104 [FIG. 3C]. If the housing 101 rotates in the horizontal direction centering on the virtual axis 104, as shown in FIG. 3C, the imaging unit 120 faces a second direction.

Eventually, as the housing 101 rotates on the support unit 103 in the horizontal direction centering on the virtual axis 104, the imaging unit 120 can move in right and left directions.

The present invention is non-limited by the above description. The controller 180 may control the housing 101 to rotate in a vertical direction. Namely, the controller 180 can control the imaging unit 120 to move in all directions.

Method of Taking Shot for Object Corresponding to External Device Satisfying Specific Condition According to one embodiment of the present invention, the portable camera 100 can control a movement of an imaging unit to take a shot for an object corresponding to an external device satisfying a specific condition among a plurality of communication connected external devices. This is described in detail with reference to FIG. 4 and FIG. 5.

Figure 4:
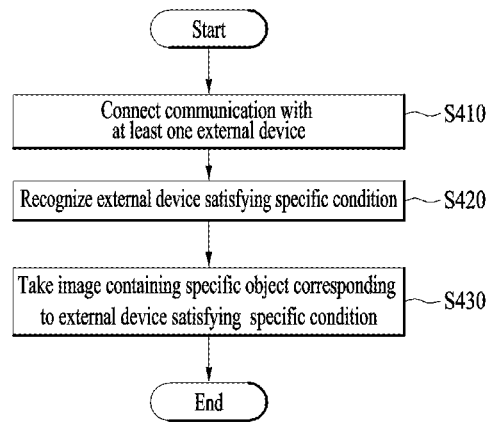
FIG. 4 is a flowchart to describe one example of a method of taking a shot for an object corresponding to an external device satisfying a preset condition in a portable camera according to one embodiment of the present invention.

FIG. 4 is a flowchart to describe one example of a method of taking a shot for an object corresponding to an external device satisfying a preset condition in a portable camera according to one embodiment of the present invention.

Referring to FIG. 4, the controller 180 of the portable camera 100 can control the communication unit 110 to connect communication with at least one external device [S410]. Herein, the at least one external device connecting the communication with the portable camera 100 may include a camera having the same structure of the portable camera 100.

In particular, the communication unit 110 may receive a specific signal from the at least one external device. The controller 180 may control the communication unit 110 to connect the communication with an external device satisfying a preset condition among the at least one external device having sent the specific signal.

For instance, if sensing an input of pressing a push button provided to the portable camera 100 for a preset time (e.g., 5 seconds), the controller 180 can control the communication unit 110 to connect the communication with the external device having set the specific signal within the preset time. The controller 180 may control the communication unit 100 not to connect the communication with the external device having sent the specific signal before or after the preset time.

For another instance, the controller 180 may control the communication unit 110 to receive contact information by connecting communication with a preset external device (e.g., user's mobile terminal). The controller 180 may control the communication unit 110 to connect communication with an external device corresponding to a contact included in the contact information among the at least one external device having sent the specific signal. And, the controller 180 may control the communication unit 110 not to connect communication with an external device corresponding to a contact failing to be included in the contact information. In this case, the controller 180 may connect communication with an external device existing in a preset distance among external devices corresponding to contacts included in the contact information.

For another instance, the controller 180 may recognize an external device previously set by a user as the preset external device and control the communication unit 110 to connect communication with the preset external device.

If the communication with the at least one external device is connected in the step S410, the controller may recognize an external device satisfying a specific condition among the at least one external device [S420].

In particular, the controller 180 may control the location information module to recognize a current location information of the portable camera. And, the controller 180 may control the communication unit 110 to receive location information of each of the communication connected at least one external device. The controller 180 may recognize the external device satisfying the specific condition using at least one of the current location information and the location information of each of the at least one external device.

For instance, using the current location information and the received location information, the controller 180 can recognize an external device located closest to the portable camera 1000 as the external device satisfying the specific condition.

For another instance, the controller 180 may control the sensing unit 140 to sense a sound generated externally. The controller 180 may recognize a direction in which the sensed sound is generated. Using the current location information and the received location information, the controller 180 may recognize an external device located in the recognized direction as the external device satisfying the specific condition.

For another instance, using the current location information and the received location information, the controller 180 may recognize at least one external device of which motion is sensed. The controller 180 may recognize an external device located closest among the movement sensed at least one external device as the external device satisfying the specific condition.

For further instance, the controller 180 may control the sensing unit 140 to recognize a front direction of the portable camera 100. Using the current location information and the received location information, the controller 180 may recognize an external device located in the recognized front direction as the external device satisfying the specific condition.

Meanwhile, if recognizing the external device satisfying the specific condition in the step S420, the controller 180 may control a movement of the imaging unit 120 to take a shot for an object corresponding to the external device satisfying the specific condition. Herein, the object may include a user of the external device satisfying the specific condition.

For instance, the controller 180 may estimate a movement of the object by analyzing the currently shot image. The controller 180 may control the movement of the imaging unit 120 to enable the imaging unit 120 to move in response to the estimated movement of the object.

For another instance, the controller 180 may sense a change of the movement of the object using a location information sent from the external device satisfying the specific condition. Using the sensed change of the movement, the controller 180 may estimate a movement of the object. The controller 180 may control the movement of the imaging unit 120 to enable the imaging unit 120 to move in response to the estimated movement of the object.

Namely, the controller 180 can control the movement of the imaging unit 120 so that the object can keep being contained in the image.

Algorithm for estimating a movement of the object may be stored in the memory 170 in advance. Yet, the present invention is non-limited by the above-mentioned example. The controller 180 may control the movement of the imaging unit 120 by recognizing the movement of the object in various ways.

Yet, according to an embodiment, if the communication between the portable camera 100 and the at least one external device is connected in the step S410, the movement of the imaging unit 120 can be controlled to take a shot for an object corresponding to the communication connected external device by skipping the step S420.

Particularly, if recognizing a prescribed external device as an external device satisfying a preset condition, the controller 180 may connect a communication with the prescribed external device satisfying the preset condition. And, the controller 180 may control a movement of the imaging unit 120 so as to take a shot for an object corresponding to the communication connected external device.

Eventually, if the communication with the prescribed external device is connected, the controller 180 can control the movement of the imaging unit 120 so as to take a shot for the object corresponding to the communication connected external device by skipping the step S420. If communications with a plurality of external devices are connected, the controller 180 recognizes an external device satisfying a specific condition among a plurality of the external devices in the step S420 and may then control the movement of the imaging unit 120 to take a shot for an object corresponding to the recognized external device.

Meanwhile, according to an embodiment, the controller 180 may recognize a size of the object in the currently shot image and then control the imaging unit 120 to zoom in or out the object in order to enable the recognized size to correspond to a preset size.

According to an embodiment, in the course of controlling a movement of the imaging unit 120 to take a shot for the object, the controller 180 can control the optical output unit 154 to discharge light in a first pattern. Namely, if controlling the movement of the imaging unit 120 before taking an image containing the object, the controller 180 may control the optical output unit 154 to discharge the light in the first pattern.

According to an embodiment, the controller 180 may control the optical output unit 154 to discharge light in a second pattern different from the first pattern, which indicates that the shot for the object is currently taken, in the course of taking the image containing the object.

Meanwhile, according to an embodiment, if an image is taken through the imaging unit 120, the controller 180 may send the taken image to an external device corresponding to an object contained in the image.

Particularly, if taking a shot for an object corresponding to the preset external device, the controller 180 can send the taken image to the preset external device.

According to the aforementioned embodiments, the controller 180 may select an object to take a shot for automatically. If the object for which the shot will be taken is selected, the imaging unit 120 can take a shot for the object by moving automatically. Hence, it is advantageously convenient for a user not to move the imaging unit 120 manually. After a communication with an external device satisfying a preset condition has been connected, it is able to take a shot while tracking a movement of a user of the communication connected external device. If communications with a plurality of external devices are connected, an external device satisfying a specific condition is recognized from a plurality of the external devices. And, it is able to take a shot while tracking a user of the recognized external device only.

Yet, according to the present invention, if the external device satisfying the specific condition is changed from a first external device into a second external device, the controller 180 may control a movement of the imaging unit 120 to take a shot for an object corresponding to the second external device. This is described in detail with reference to FIG. 5.

Figure 5:
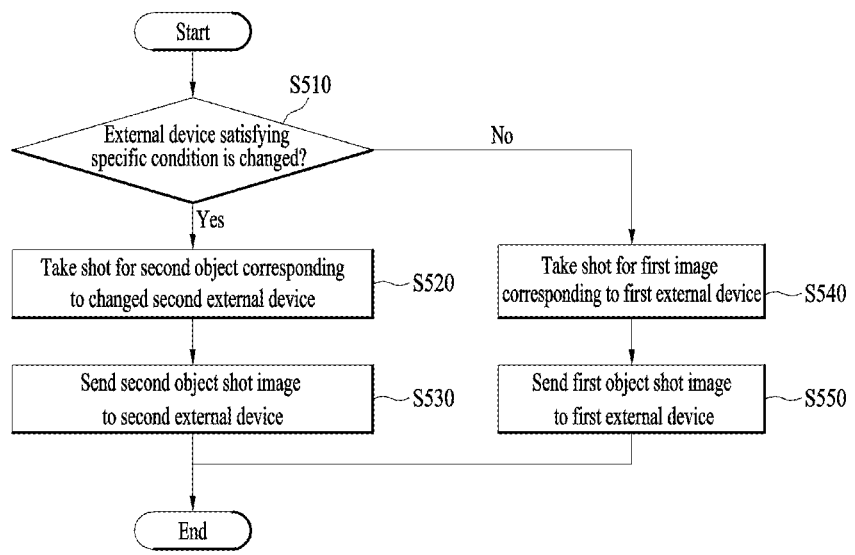
FIG. 5 is a flowchart to describe one example of a method of taking a shot, if an external device satisfying a preset condition is changed, in a portable camera according to one embodiment of the present invention.

FIG. 5 is a flowchart to describe one example of a method of taking a shot, if an external device satisfying a preset condition is changed, in a portable camera according to one embodiment of the present invention.

According to one embodiment of the present invention, the controller 180 may connect communication with an external device satisfying a preset condition.

In particular, if a first external device and a second external device satisfy the specific condition, the controller 180 may control the communication unit 110 to connect communications with the first external device and the second external device.

In case that there are a plurality of the communication connected external devices, the controller 180 may control a movement of the imaging unit 120 to take a shot for an object corresponding to an external device satisfying a specific condition.

In particular, if recognizing that the first external device is the external device satisfying the specific condition with respect to the first and second external devices, the controller 180 can control the movement of the imaging unit 120 to take a shot for a first object corresponding to the first external device.

While taking the shot for the first object, the controller 180 can recognize whether the external device satisfying the specific condition is changed [S510].

And, the controller 180 may control the location information module to recognize a current location information of the portable camera. And, the controller 180 may control the communication unit 110 to receive a location information from each of the first and second external devices. Suing at least one of the current location information and the location informations of the external devices received from the first and second external devices, the controller 180 may recognize the external device satisfying the specific condition, In doing so, the controller 180 checks at least one of the current location information, the location information received from the first external device and the location information received from the second external device by real time, thereby recognizing whether the external device satisfying the specific condition is changed.

For instance, if the external device satisfying the specific condition is an external device located closest, the controller 180 can recognize whether the external device located closest is changed using the current information and the received location informations.

For another instance, the controller 180 may control the sensing unit 140 to sense an externally generated sound. Using a change of a direction in which the sensed sound is generated, the current location information and the received location informations, the controller 180 may recognize whether the external device satisfying the specific condition is changed.

For another instance, using the current location information and the received location informations, the controller 180 may recognize at least one external device, of which movement is sensed. If the external device satisfying the specific condition is the movement recognized external device among the external devices located closest, the controller 180 may recognize whether the external device satisfying the specific condition is changed using the sensed movement, the current location information and the received location informations.

For further instance, the controller 180 may control the sensing unit 140 to recognize a front direction of the portable camera 100. If the external device satisfying the specific condition is an external device located in the front direction of the portable camera 100, the controller 180 may recognize whether the external device satisfying the specific condition is changed using a change of the recognized front direction, the current location information and the received location informations.

If recognizing that the external device satisfying the specific condition is changed into the second external device from the first external device in the step S510 [Yes], the controller 180 may control a movement of the imaging unit 120 to take a shot for a second object corresponding to the changed second external device [S520].

According to an embodiment, in the course of controlling a movement of the imaging unit 120 to take a shot for the second object, the controller 180 can control the optical output unit 154 to discharge light in a first pattern.

Moreover, while taking a shot for the second object, the controller 180 may control the optical output unit 154 to discharge light in a second pattern different from the first pattern, which indicates that the shot for the second object is currently taken.

Meanwhile, if taking a shot for the second object in the step S520, the controller 180 may control the communication unit 110 to send the second object to the second external device [S530].

For instance, in the course of taking the shot for the second object, the controller 180 may control the communication unit 110 to send the second object shot image to the second external device by real time.

For another instance, after the shot for the second object corresponding to the second external device has been completed, the controller 180 may control the communication unit 110 to send an image of the shot completed second object to the second external device.

For further instance, if a preset situation (e.g., a situation that a battery level becomes equal to or lower than a preset level) occurs, the controller 180 may control the communication unit 110 to send the second object shot image to the second external device by real time. If the preset situation fails to occur, the controller 180 may control the communication unit 110 to send the second object shot image to the second external device after completing the shot for the second object.

If the external device satisfying the specific condition is not changed in the step S510 [No], the controller 180 may control the movement of the imaging unit 120 to continue to take the shot for the first object corresponding to the first external device [S540].

If taking the shot for the first object in the step S540, the controller 180 may control the communication unit 110 to send a first object shot image to the first external device [S550].

For instance, in the course of taking the shot for the first object corresponding to the first external device, the controller 180 may control the communication unit 110 to send a first object shot image to the first external device by real time.

For another instance, after the shot for the first object corresponding to the first external device has been completed, the controller 180 may control the communication unit 110 to send an image of the shot completed first object to the first external device.

For further instance, if a preset situation (e.g., a situation that a battery level becomes equal to or lower than a preset level) occurs, the controller 180 may control the communication unit 110 to send the first object shot image to the first external device by real time. If the preset situation fails to occur, the controller 180 may control the communication unit 110 to send the first object shot image to the first external device after completing the shot for the first object.

According to a related art, in order to selectively take a shot for a subject satisfying a specific condition, it is inconvenient for a user to take a shot for the subject satisfying the specific condition only by moving an imaging unit in direct.

Yet, according to the above embodiment, if the subject satisfying the specific condition is changed, it is advantageous in conveniently taking a shot for the subject satisfying the specific condition in a manner that the imaging unit automatically moves to take a shot for the changed subject only.

Method of Connecting Communication with at Least One External Device

Meanwhile, according to one embodiment of the present invention, the controller 180 can control the communication unit 110 to connect communication with at least one external device.

For instance, the controller 180 may connect communications with all external devices attempting to connect communications with the portable camera 100 without any restriction.

Figure 6A:
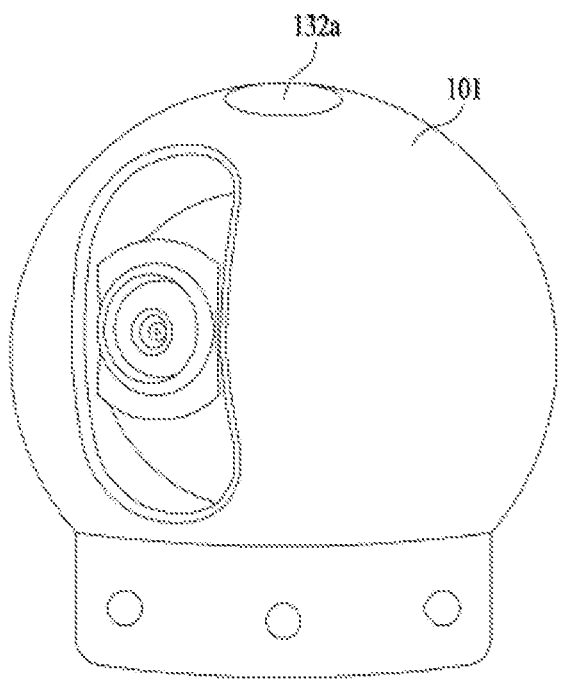
FIGS. 6A and 6B are diagrams to describe one example of a method of connecting a communication with at least one external device satisfying a preset condition in a portable camera according to one embodiment of the present invention.
Figure 6B:
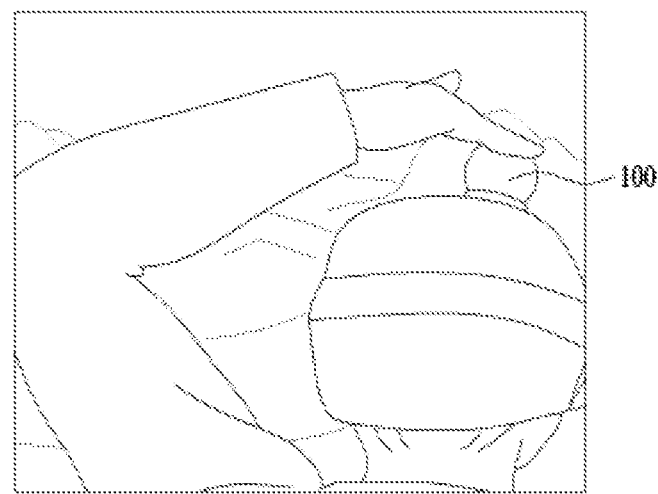

For another instance, the controller 180 may connect communication with at least one external device satisfying a preset condition among external devices attempting to connect communications with the portable camera 100. With reference to FIGS. 6A and 6B, a method of connecting communication with at least one external device satisfying a preset condition is described in detail as follows.

FIGS. 6A and 6B are diagrams to describe one example of a method of connecting a communication with at least one external device satisfying a preset condition in a portable camera according to one embodiment of the present invention.

Referring to FIGS. 6A and 6B, if sensing a specific input for a preset time through the input unit 130, the controller 180 may control the communication unit 110 to connect communication with an external device having sent a specific signal for the preset time.

Particularly, referring to FIG. 6A, the mobile terminal 100 may have a push button 132a provided to a top end of the housing 101. Referring to FIG. 6B, the controller 180 may sense a user input of keeping pressing the push button 132a for a preset time (e.g., 5 seconds) as the specific input.

If the push button 132a keeps being pressed for the preset time, the controller 180 may control the communication unit 110 to receive a specific signal from at least one external device within the preset time. Herein, the specific signal may include a signal sent by the at least one external device to connect communication with the portable camera 100. The controller 180 may control the communication unit 110 to connect the communication with the external device having sent the specific signal for the preset time.

For instance, assuming that first to third users possess first to third portable cameras, respectively, if the first user presses the push button 132a of the first portable camera for a preset time and the second user presses the push button 132a of the second portable camera within the preset time, the second portable camera can send a specific signal to the first potable camera. In doing so, a communication between the first and second portable cameras can be connected. And, the third portable camera fails to connect communications with the first and second portable cameras.

Yet, in this case, if the user of the portable camera keeps pressing the push button 132a, since the user of each of the second and third portable cameras is unable to check whether the user of the first portable camera keeps pressing the push button 132a, it may cause a problem of difficulty in connecting communication with the first portable camera.

A method of solving such a problem is described as follows.

First of all, according to one embodiment of the present invention, in response to an input to the push button 132a, the first portable camera may send a signal corresponding to the input to an external device. In doing so, each of the second and third portable cameras existing near the first portable camera may receive the signal. When receiving the signal, each of the second and third portable cameras may output a preset alarm (e.g., vibration in a preset pattern, a sound in a preset pattern, etc.). When the preset alarm is outputted from each of the second and third portable cameras, the user of each of the second and third portable cameras may recognize that the first portable camera has sent the signal corresponding to the input. If so, the user of each of the second and third portable cameras performs an action (e.g., an action of pressing the push button of the corresponding user's portable camera within the preset time) corresponding to the alarm, thereby enabling the corresponding portable camera to connect communication with the first portable camera.

Meanwhile, according to an embodiment, the controller 180 may control the communication unit 110 to receive contact information by connecting communication with a preset external device (e.g., user's mobile terminal). The controller 180 may control the communication unit 110 to connect the communication with the external device corresponding to a contact included in the contact information among at least one external device having sent the specific signal. And, the controller 180 may control the communication unit 110 not to connect communication with an external device corresponding to a contact failing to be included in the contact information. In this case, the controller 180 may connect communication with an external device existing in a preset distance among external devices corresponding to contacts included in the contact information.

Method of Outputting Specific Alarm in Response to Occurrence of Preset Event

According to one embodiment of the present invention, if a preset event (e.g., a case of connecting communication with at least one external device, etc.) occurs, the controller 180 can control the output unit 150 to output a notification indicating the occurrence of the preset event. This is described in detail with reference to FIG. 7 and FIGS. 8A and 8B.

Figure 7:
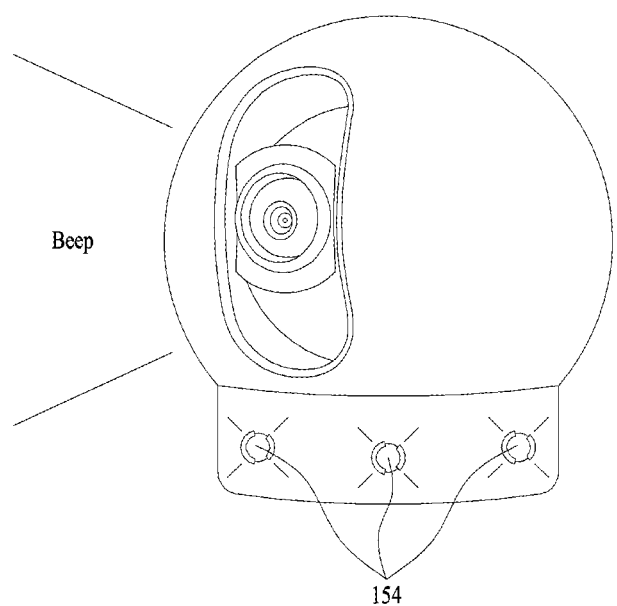
FIG. 7 is a diagram to describe one example of a method of outputting a specific notification in response to an occurrence of a preset event in a portable camera according to one embodiment of the present invention.

FIG. 7 is a diagram to describe one example of a method of outputting a specific notification in response to an occurrence of a preset event in a portable camera according to one embodiment of the present invention.

According to one embodiment of the present invention, the controller 180 may control the communication unit 110 to connect communication with at least one external device. If the communication with the at least one external device is connected, the controller 180 may control the output unit 150 to output a specific notification.

Referring to FIG. 7, when the communication with the at least one external device is connected, the controller 180 may control the optical output unit 154 to discharge light in a preset pattern. The following description shall be made on the assumption that a plurality of the optical output units 154 are included in the portable camera 100.

For instance, the controller 180 may control a plurality of the optical output units 154 to discharge lights in the same color for a preset time.

For another instance, the controller 180 may control a plurality of the optical output units 154 to discharge lights in different colors, respectively.

For further instance, the controller 180 may control a plurality of the optical output units 154 to discharge lights in same or different colors in order, respectively.

The present invention is non-limited by the above description. And, light can be discharged from the optical output unit 154 in various ways.

Meanwhile, the controller 180 may control the optical output unit 154 to discharge light in a different color according to an external device having a connected communication with the portable camera 100. Particularly, the controller 180 may control the communication unit 110 to receive a specific signal including color information from the communication connected external device.

For instance, if the portable camera 100 connects a communication with a first external device, the controller 180 can control the optical output unit 154 to discharge light in a first color. For another instance, if the portable camera 100 connects a communication with a second external device, the controller 180 can control the optical output unit 154 to discharge light in a second color different from the first color.

According to an embodiment, the controller 180 may control the audio output unit 152 to output a preset sound (e.g., 'beep' sound) when a communication with the at least one external device is connected.

According to an embodiment, the controller 180 may control the haptic unit 153 to output a preset vibration when a communication with the at least one external device is connected.

Namely, when the communication with the at least one external device is connected, the controller 180 may control the output unit 150 to output at least one of a preset pattern light, a preset sound and a preset vibration.

Meanwhile, according to an embodiment, before a communication with an external device is connected, if receiving a signal for confirming a presence or non-presence of performing a communication connection from a specific external device, the controller 180 may control the output unit 150 to output at least one of the preset light, the preset sound and the preset vibration.

Figure 8A:
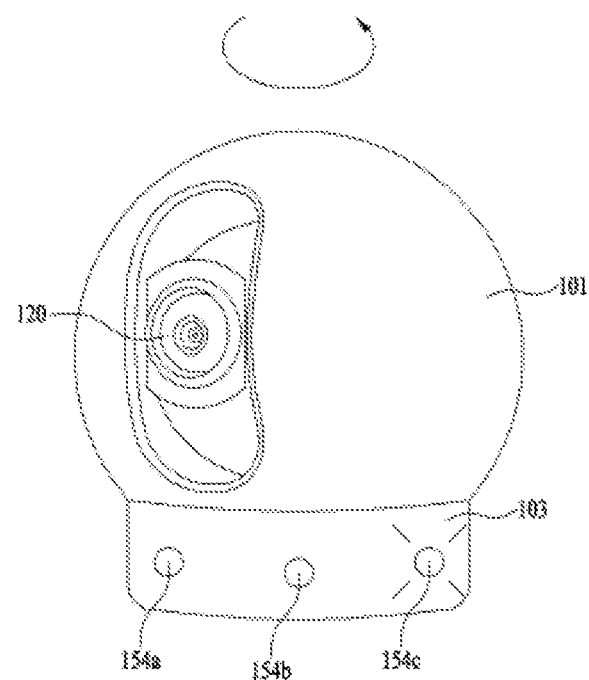
FIGS. 8A and 8B are diagrams to describe another example of a method of outputting a specific notification in response to an occurrence of a preset event in a portable camera according to one embodiment of the present invention.
Figure 8B:
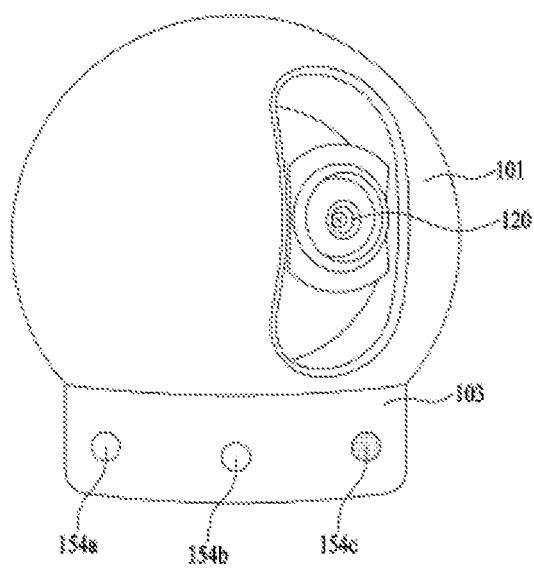

FIGS. 8A and 8B are diagrams to describe another example of a method of outputting a specific notification in response to an occurrence of a preset event in a portable camera according to one embodiment of the present invention.

Referring to FIGS. 8A and 8B, the portable camera 100 may include a plurality of optical output units 154a to 154c. Each of a plurality of the optical output units 154a to 154c may be disposed on the support unit 103.

For instance, the first optical output unit 154a may be disposed at a first location. The second optical output unit 154b may be disposed at a second location spaced apart from the first optical output unit 154a in a preset distance. The third optical output unit 154c may be disposed at a third location spaced apart from the second optical output unit 154b in a preset distance.

Meanwhile, according to one embodiment of the present invention, the controller 180 can control a movement of the imaging unit 120 to take a shot for an object corresponding to an external device satisfying a specific condition. In doing so, the controller 180 can control the optical output unit 154 to discharge light in a first pattern while moving the imaging unit 120.

Meanwhile, while taking a shot for the object corresponding to the external device satisfying the specific condition through the imaging unit 120, the controller 180 can control the optical output unit 154 to discharge light in a second pattern.

For instance, referring to FIG. 8A, the controller 180 can recognize that the object exists in a direction corresponding to the third location. In order to take a shot for the object, the controller 180 can control a movement of the imaging unit 120. While the imaging unit 120 is moving, the controller 180 may control a plurality of the optical output units 154a to 154c to enable light to flicker from the third optical output unit 154c disposed as the third location only.

Namely, if the third optical output unit 154 disposed at the third location flickers, a user can recognize that the imaging unit 120 is moving in the direction corresponding to the third location.

Meanwhile, referring to FIG. 8B, while taking a shot for the object, the controller 180 can control only the third optical output unit 154c to discharge light.

If the light keeps being discharged from the third optical output unit 154c, a user can recognize that the imaging unit 120 is located at the third location and is taking a shot for the object.

Method of Recognizing External Device Satisfying Specific Condition

According to one embodiment of the present invention, the controller 180 can recognize an external device satisfying a specific condition among a plurality of external devices having communications connected with the portable camera 100. This is described in detail with reference to FIG. 9 and FIG. 10.

Figure 9:
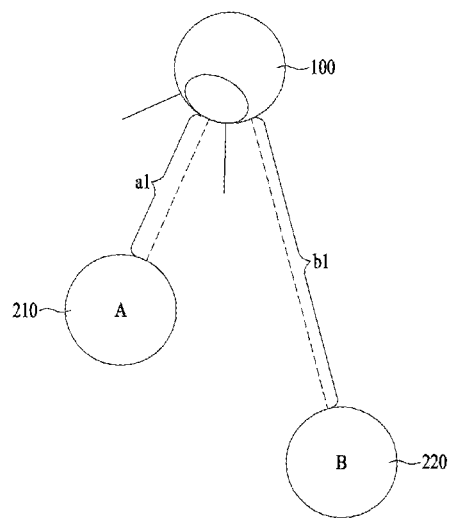
FIG. 9 is a diagram to describe one example of a method of recognizing an external device satisfying a specific condition in a portable camera according to one embodiment of the present invention.

FIG. 9 is a diagram to describe one example of a method of recognizing an external device satisfying a specific condition in a portable camera according to one embodiment of the present invention.

If a plurality of external devices satisfy a preset condition, the controller 180 may control the communication unit 110 to connect communications with a plurality of the external devices. The controller 180 may control the communication unit 110 to receive location information from each of a plurality of the external devices. And, the controller 180 may control the location information module to recognize a current location information of the portable camera.

Using the current location information and the received location information, the controller 180 may recognize an external device located closest to the portable camera 100 as the external device satisfying the specific condition.

Particularly, referring to FIG. 9, if communications with a first external device 210 and a second external device 220 are connected, the controller 180 may control the communication unit 110 to receive location information from each of the first and second external devices 210 and 220. Based on the location information received from the first external device 210 and the current location information, the controller 180 may recognize that the first external device 210 is spaced apart from the portable camera 100 in a distance a1. Based on the location information received from the second external device 220 and the current location information, the controller 180 may recognize that the second external device 220 is spaced apart from the portable camera 100 in a distance b1. The controller 180 may recognize the first external device 210 located in a shorter one of the distance a1 and the distance b1 as the external device satisfying the specific condition.

Herein, a method for the portable camera 100 to recognize a distance from each of a plurality of the external devices is described as follows.

For instance, the controller 180 can recognize a current location of the portable camera 100 using the location information module. Based on the location informations received from a plurality of the external devices, the controller 180 can recognize the current locations of a plurality of the external devices. Using the current location of the portable camera 100 and the current locations of a plurality of the external devices, the controller 180 can recognize a distance between the portable camera 100 and each of a plurality of the external devices.

For another instance, using signals received from a plurality of the communication connected external devices, the controller 180 may recognize a distance from each of a plurality of the external devices.

Particularly, using at least one of a signal strength and a signal loss rate of each of the received signals, the controller 180 can recognize a distance from each of a plurality of the external devices. And, the controller 180 may control the communication unit 110 to send a first signal to a plurality of the external devices and receive a second signal corresponding to the first signal from each of a plurality of the external devices. In doing so, the controller 180 may recognize the distance between the portable camera 100 and each of a plurality of the external devices by calculating a time taken to receive the second signal after sending the first signal.

The method of recognizing the distance between the portable camera 100 and the external device is non-limited by the above example. And, the recognition can be made using the infrared sensor, the radar sensor and the like included in the sensing unit 140.

Figure 10:
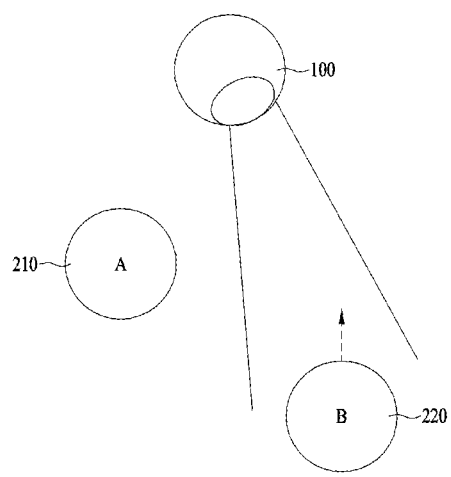
FIG. 10 is a diagram to describe another example of a method of recognizing an external device satisfying a specific condition in a portable camera according to one embodiment of the present invention.

FIG. 10 is a diagram to describe another example of a method of recognizing an external device satisfying a specific condition in a portable camera according to one embodiment of the present invention.

If a plurality of external devices satisfy a preset condition, the controller 180 may control the communication unit 110 to connect communications with a plurality of the external devices. The controller 180 may control the communication unit 110 to receive location information from each of a plurality of the external devices. Using the received location information, the controller 180 may recognize a movement sensed external device among a plurality of the external devices as the external device satisfying the specific condition.

Particularly, referring to FIG. 10, if communications with a first external device 210 and a second external device 220 are connected, the controller 180 may recognize a movement of the first external device 210 based on the location information received from the first external device 210. And, the controller 180 may recognize a movement of the second external device 220 based on the location information received from the second external device 220. Herein, the controller 180 can recognize the movement recognized second external device 220 as the external device satisfying the specific condition.

Meanwhile, according to an embodiment, if every external device having a connected communication with the portable camera 100 is moving, the controller 180 may recognize an external device existing in a closest distance, as shown in FIG. 9, as the external device satisfying the specific condition.

Figure 11:
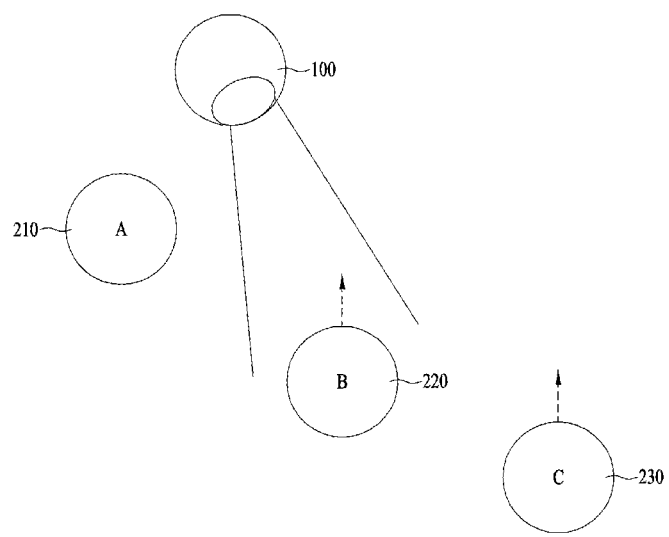
FIG. 11 is a diagram to describe another example of a method of recognizing an external device satisfying a specific condition in a portable camera according to one embodiment of the present invention.

FIG. 11 is a diagram to describe another example of a method of recognizing an external device satisfying a specific condition in a portable camera according to one embodiment of the present invention.

If a plurality of external devices satisfy a preset condition, the controller 180 may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100.

Using the received location information and the current location information, the controller 180 may recognize an external device located in a closest distance among movement sensed external devices as the external device satisfying the specific condition.

Particularly, referring to FIG. 11, if communications with a first external device 210, a second external device 220 and a third external device 230 are connected, the controller 180 may receive location information from each of the first external device 210, the second external device 220 and the third external device 230. Using the received location informations, the controller 180 may recognize that the movement sensed external devices include the second external device 220 and the third external device 230. Using the received location information and the current location information, the controller 180 may recognize a distance between the portable camera 100 and each of the second external device 220 and the third external device 230. The controller 180 may recognize the second external device 220 located in a closer distance, which is selected from the second and third external devices 220 and 230, as the external device satisfying the specific condition.

Figure 12:
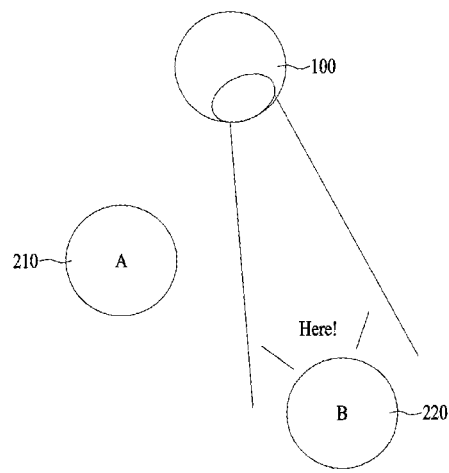
FIG. 12 is a diagram to describe another example of a method of recognizing an external device satisfying a specific condition in a portable camera according to one embodiment of the present invention.

FIG. 12 is a diagram to describe another example of a method of recognizing an external device satisfying a specific condition in a portable camera according to one embodiment of the present invention.

If a plurality of external devices satisfy a preset condition, the controller 180 may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100.

The controller 180 may control the sensing unit 140 to sense an externally generated sound. The controller 180 may recognize a direction in which the sensed sound is generated and then recognize an external device located in the recognized direction as the external device satisfying the specific condition.

Particularly, referring to FIG. 12, the controller 180 may receive location information from each of a first external device 210 and a second external device 220. If sensing a sound in a specific direction through the sensing unit 140, the controller 180 may recognize an external device located in the sensed direction using the received location information and the current location information. In this case, the controller 180 may recognize the second external device 220 located in the sound recognized direction as the external device satisfying the specific condition.

Figure 13:
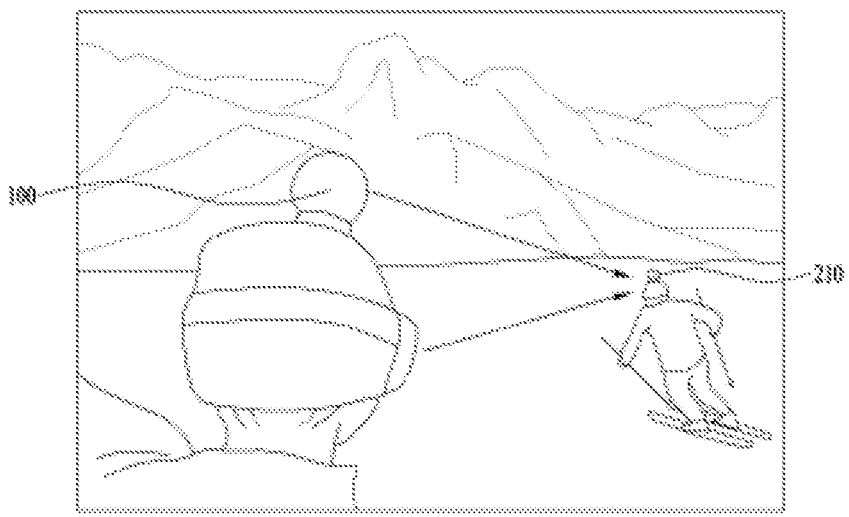
FIG. 13 is a diagram to describe further example of a method of recognizing an external device satisfying a specific condition in a portable camera according to one embodiment of the present invention.

FIG. 13 is a diagram to describe further example of a method of recognizing an external device satisfying a specific condition in a portable camera according to one embodiment of the present invention.

If the controller 180 recognizes that a plurality of external devices satisfy a preset condition, it may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100.

The controller 180 may control the sensing unit 140 to recognize a direction in which a front side of the portable camera 100 faces. The controller 180 may recognize an external device located in the direction recognized through the sensing unit 140 as the external device satisfying the specific condition.

Particularly, referring to FIG. 13, the controller 180 may recognize a direction in which the front side of the portable camera faces. Based on the received location information, the current location information and the recognized direction, the controller 180 may recognize the first external device 210 as the external device satisfying the specific condition. Herein, if the portable camera 100 is attached to a helmet of a user, the front direction may correspond to a direction of user's eyes.

Case of Changing External Device Satisfying Specific Condition

According to one embodiment of the present invention, the controller 180 can continue to check an external device satisfying a specific condition. If the external device satisfying the specific condition is changed, the controller 180 can control a movement of the imaging unit so as to take a shot for an object corresponding to the changed external device. This is described in detail with reference to FIGS. 14A and 14B to FIG. 18.

Figure 14A:
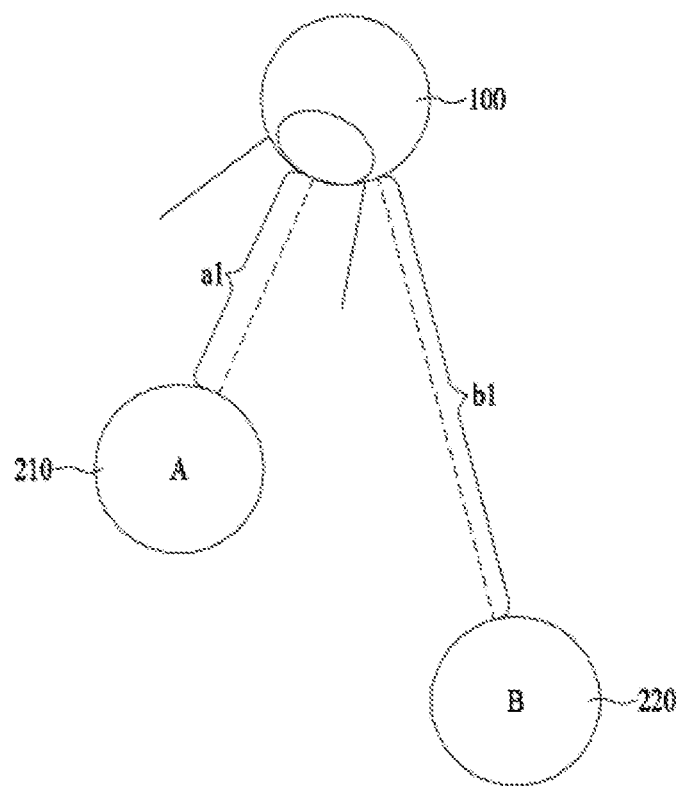
FIGS. 14A and 14B are diagrams to describe one example of a method of if an external device satisfying a preset condition is changed, taking a shot for an object corresponding to the changed external device in a portable camera according to one embodiment of the present invention.
Figure 14B:
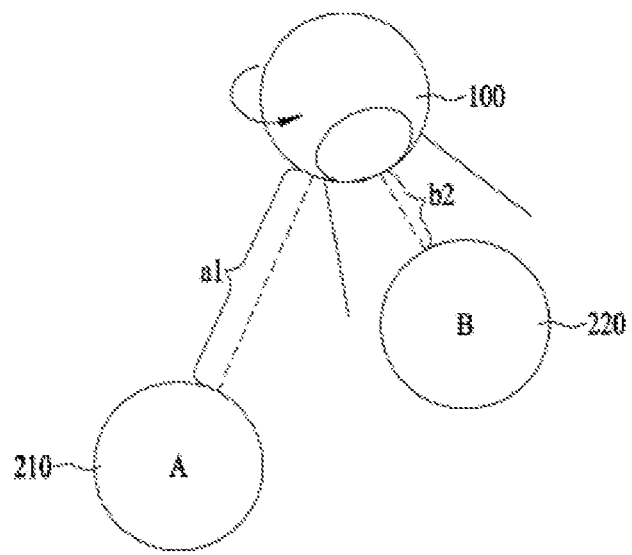

FIGS. 14A and 14B are diagrams to describe one example of a method of if an external device satisfying a preset condition is changed, taking a shot for an object corresponding to the changed external device in a portable camera according to one embodiment of the present invention.

Regarding FIGS. 14A and 14B, the following description shall be made on the assumption that the external device satisfying the specific condition is an external device located closest to the portable camera 100.

If the controller 180 recognizes that a plurality of external devices satisfy a preset condition, it may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100.

Particularly, if communications with a first external device 210 and a second external device 220 are connected, the controller 180 may control the communication unit 110 to receive location information from each of the first and second external devices 210 and 220. Based on the location information received from the first external device 210 and the current location information, the controller 180 may recognize that the first external device 210 is spaced apart from the portable camera 100 in a distance a1. Based on the location information received from the second external device 220 and the current location information, the controller 180 may recognize that the second external device 220 is spaced apart from the portable camera 100 in a distance b1.

Referring to FIG. 14A, the controller 180 may recognize that the distance a1 is shorter than the distance b1. Hence, the controller 180 may control a movement of the imaging unit 120 so as to take a shot for a first object corresponding to the first external device 210.

Referring to FIG. 14B, as the second external device 220 moves, if the controller 180 recognizes that the second external device 220 is spaced apart from the portable camera 100 in the distance b2, the controller 180 may recognize that the distance b2 gets shorter than the distance a1. Namely, the controller 180 may recognize that the external device satisfying the specific condition has been changed into the second external device 220 from the first external device 210. In this case, the controller 180 may control a movement of the imaging unit 120 so as to take a shot for a second object corresponding to the second external device 220.

Figure 15A:
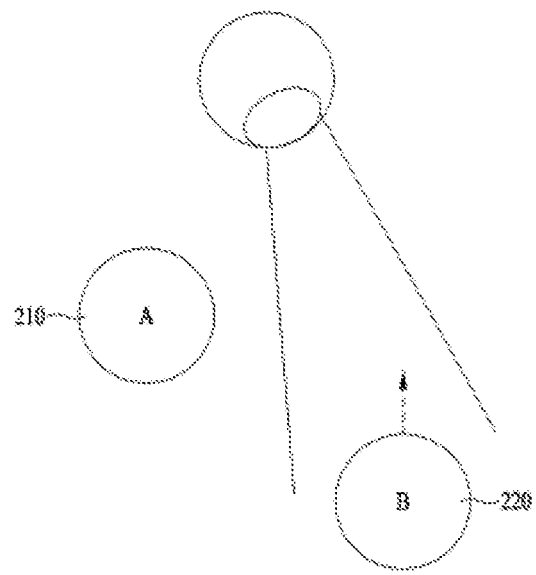
FIGS. 15A and 15B are diagrams to describe another example of a method of if an external device satisfying a preset condition is changed, taking a shot for an object corresponding to the changed external device in a portable camera according to one embodiment of the present invention.
Figure 15B:
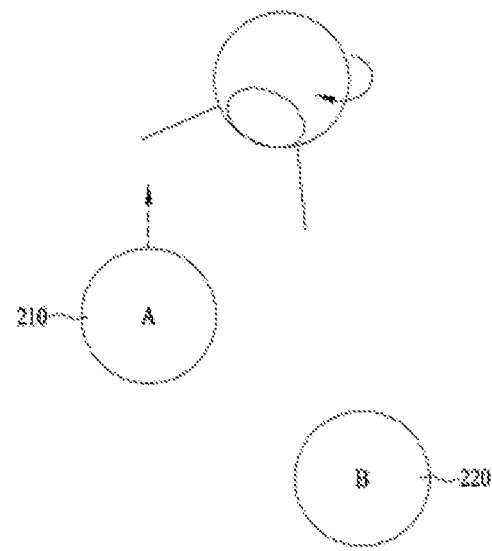

FIGS. 15A and 15B are diagrams to describe another example of a method of if an external device satisfying a preset condition is changed, taking a shot for an object corresponding to the changed external device in a portable camera according to one embodiment of the present invention.

Regarding FIGS. 15A and 15B, the following description shall be made on the assumption that the external device satisfying the specific condition is an external device, of which movement is sensed.

If the controller 180 recognizes that a plurality of external devices satisfy a preset condition, it may control the communication unit 110 to connect communications with a plurality of the external devices. The controller 180 may control the communication unit 110 to receive location information from each of a plurality of the external devices. Herein, a plurality of the external devices may include a first external device 210 and a second external device 220 at least.

Particularly, if communications with the first external device 210 and the second external device 220 are connected, the controller 180 may control the communication unit 110 to receive location information from each of the first and second external devices 210 and 220. Based on the location information received from the first external device 210, the controller 180 may recognize a movement of the first external device 210. Based on the location information received from the second external device 220, the controller 180 may recognize a movement of the second external device 220.

Referring to FIG. 15A, the controller 180 may recognize the movement recognized second external device 220 as the external device satisfying the specific condition. Hence, the controller 180 may control a movement of the imaging unit 120 so as to take a shot for a second object corresponding to the second external device 220.

Referring to FIG. 15B, the controller 180 may continue to check a movement sensed external device. The controller 180 may recognize that the movement of the first external device 210 is sensed instead of sensing the movement of the second external device 220. Namely, the controller 180 may recognize that the external device satisfying the specific condition has been changed from the second external device 220 into the first external device 210. In this case, the controller 180 may control a movement of the imaging unit 120 so as to take a shot for a first object corresponding to the first external device 210.

Figure 16A:
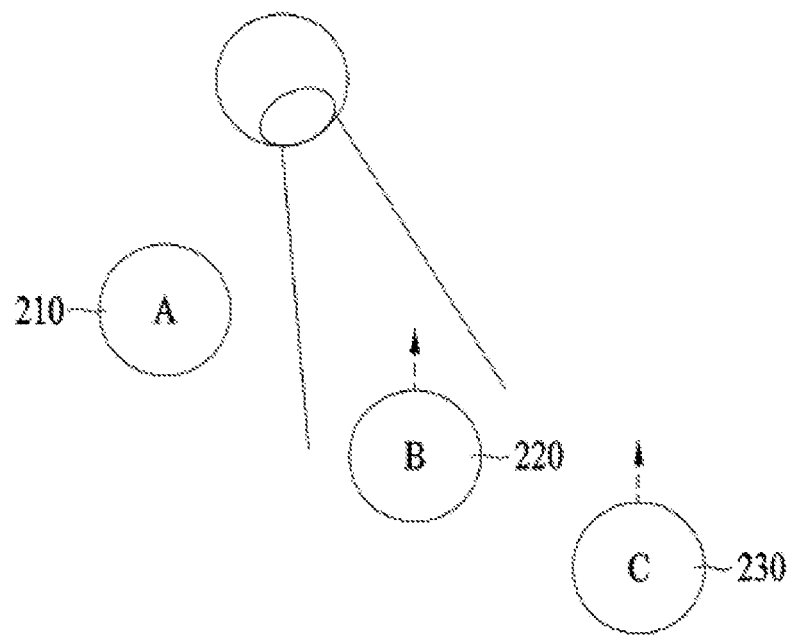
FIGS. 16A and 16B are diagrams to describe another example of a method of if an external device satisfying a preset condition is changed, taking a shot for an object corresponding to the changed external device in a portable camera according to one embodiment of the present invention.
Figure 16B:
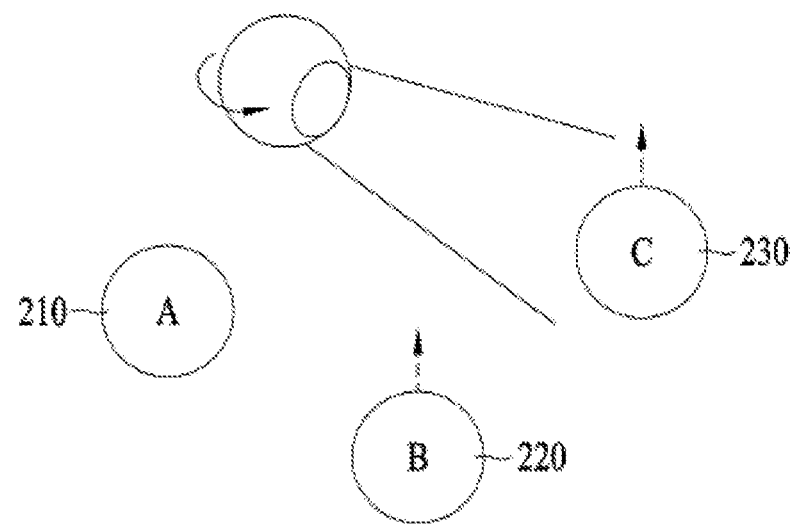

FIGS. 16A and 16B are diagrams to describe another example of a method of if an external device satisfying a preset condition is changed, taking a shot for an object corresponding to the changed external device in a portable camera according to one embodiment of the present invention.

Regarding FIGS. 16A and 16B, the following description shall be made on the assumption that the external device satisfying the specific condition is an external device located closest to the portable camera 100 among external devices, of which movements are sensed.

If the controller 180 recognizes that a plurality of external devices satisfy a preset condition, it may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100. Herein, a plurality of the external devices may include a first external device 210, a second external device 220 and a third external device 230 at least.

Particularly, if communications with the first external device 210, the second external device 220 and the third external device 230 are connected, the controller 180 may control the communication unit 110 to receive location information from each of the first external device 210, the second external device 220 and the third external device 230. Based on the location informations received from the first external device 210, the second external device 220 and the third external device 230, the controller 180 may recognize movements of the first external device 210, the second external device 220 and the third external device 230, respectively.

Referring to FIG. 16A, the controller 180 may recognize the movements of the first external device 210, the second external device 220 and the third external device 230. In doing so, based on the location informations respectively received from the second external device 220 and the third external device 230 and the current location information, the controller 180 may recognize a distance between the portable camera 100 and each of the second external device 220 and the third external device 230. Herein, the controller 180 may recognize the second external device 220 located in a closer distance, which is selected from the second external device 220 and the third external device 230, as the external device satisfying the specific condition. The controller 180 may control the movement of the imaging unit 120 so as to take a shot for a second object corresponding to the recognized second external device 220.

Referring to FIG. 16B, the controller 180 may recognize that a distance between the third external device 230 and the portable camera 100 gets shorter than a distance between the second external device 220 and the portable camera 100 regarding the movement recognized second external device 200 and the movement recognized third external device 230. Namely, the controller 180 may recognize that the external device satisfying the specific condition has been changed into the third external device 230 from the second external device 220. In this case, the controller 180 may control a movement of the imaging unit 120 so as to take a shot for a third object corresponding to the third external device 230.

Figure 17A:
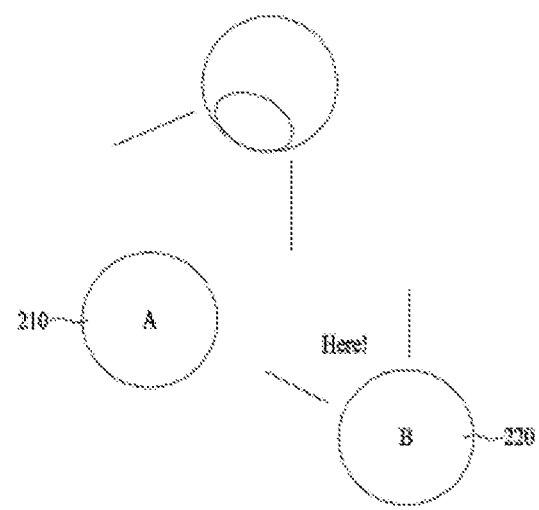
FIGS. 17A and 17B are diagrams to describe further example of a method of if an external device satisfying a preset condition is changed, taking a shot for an object corresponding to the changed external device in a portable camera according to one embodiment of the present invention.
Figure 17B:
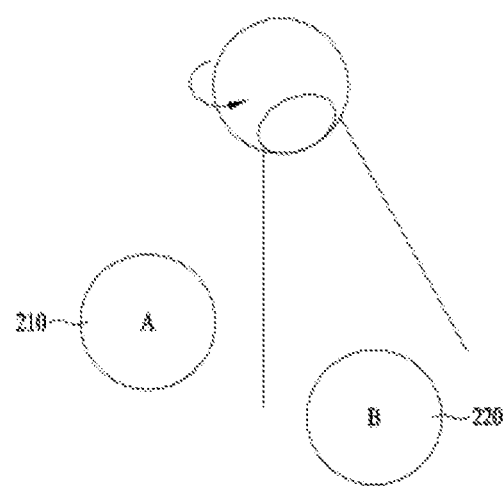

FIGS. 17A and 17B are diagrams to describe further example of a method of if an external device satisfying a preset condition is changed, taking a shot for an object corresponding to the changed external device in a portable camera according to one embodiment of the present invention.

Regarding FIGS. 17A and 17B, the following description shall be made on the assumption that the external device satisfying the specific condition is an external device located in an externally generated sound recognized direction.

If the controller 180 recognizes that a plurality of external devices satisfy a preset condition, the controller 180 may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100. Herein, a plurality of the external devices may include a first external device 210 and a second external device 220 at least.

The controller 180 may control the sensing unit 140 to sense an externally generated sound. The controller 180 may recognize a direction in which the sensed sound is generated and then recognize an external device located in the recognized direction as the external device satisfying the specific condition.

Particularly, if communications with the first external device 210 and the second external device 220 are connected, the controller 180 may receive location information from each of the first and second external devices 210 and 220.

Referring to FIG. 17A, if sensing a sound in a specific direction through the sensing unit 140, the controller 180 may recognize the second external device 220 existing in the sensed direction using the received location information and the current location information. In this case, the controller 180 may recognize the second external device 220 located in the sound recognized direction as the external device satisfying the specific condition.

Referring to FIG. 17B, the controller 180 may control a movement of the imaging unit 120 so as to take a shot for a second object corresponding to the second external device 200.

Figure 18A:
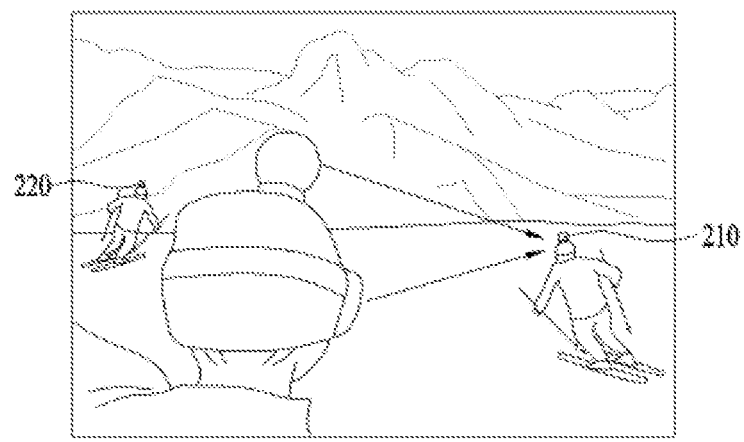
FIGS. 18A and 18B are diagrams to describe another further example of a method of recognizing an external device satisfying a specific condition in a portable camera according to one embodiment of the present invention.
Figure 18B:
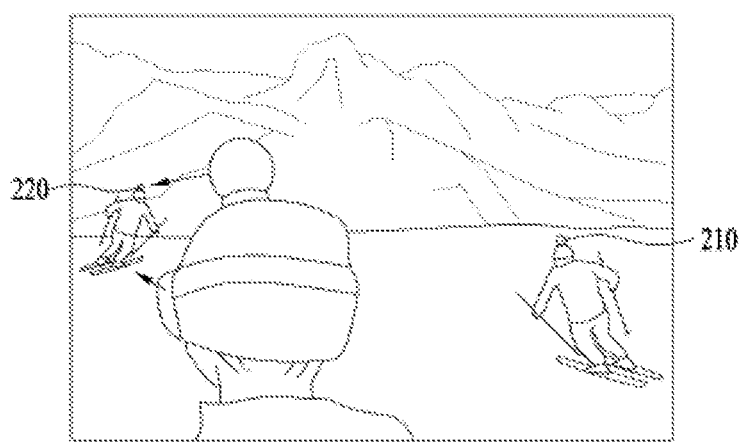

FIGS. 18A and 18B are diagrams to describe another further example of a method of recognizing an external device satisfying a specific condition in a portable camera according to one embodiment of the present invention.

Regarding FIGS. 18A and 18B, the following description shall be made on the assumption that the external device satisfying the specific condition is an external device located in a front direction of the portable terminal 100.

If the controller 180 recognizes that a plurality of external devices satisfy a preset condition, the controller 180 may control the communication unit 110 to connect communications with a plurality of the external devices. The controller 180 may control the communication unit 110 to receive location information from each of a plurality of the external devices. And, the controller 180 may control the location information module to recognize a current location information of the portable camera 100. Herein, a plurality of the external devices may include a first external device 210 and a second external device 220 at least.

The controller 180 may control the sensing unit 140 to sense a direction faced by a front side of the portable camera 100. The controller 180 may recognize an external device located in the direction recognized through the sensing unit 140 as the external device satisfying the specific condition.

Referring to FIG. 18A, if the portable camera 100 connects communications with the first external device 210 and the second external device 220, the controller 180 may recognize a direction faced by the front side of the portable camera 100. Based on the received location information, the current location information and the recognized direction, the controller 180 may recognize the first external device 210, which is selected from the first and second devices 210 and 220, as the external device satisfying the specific condition. Herein, if the portable camera 100 is attached to a helmet of a user, the front direction may correspond to a direction of user's eyes.

Referring to FIG. 18B, if recognizing a change of the front direction of the portable camera, the controller 180 may recognize the second external device 220 existing in the changed front direction, which is selected from the first and second external devices 210 and 220, as the external device satisfying the specific condition. Namely, the controller 180 may recognize that the external device satisfying the specific condition is changed into the second external device 220 from the first external device 210. In this case, the controller 180 may control a movement of the imaging unit 120 so as to take a shot for the second external device 200.

Method of Enlarging (Zooming-in) or Reducing (Zooming-Out) Specific Object

According to one embodiment of the present invention, when the portable terminal 100 takes an image, in order for a size of an object contained in the image to correspond to a preset size, it is able to zoom in or out the object. This is described in detail with reference to FIG. 19.

Figure 19:
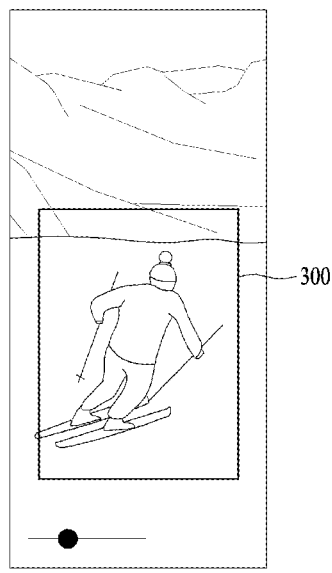
FIG. 19 is a diagram to describe one example of a method of enlarging or reducing an object to enable a size of the object contained in a shot image to correspond to a preset size in a portable camera according to one embodiment of the present invention.

FIG. 19 is a diagram to describe one example of a method of enlarging or reducing an object to enable a size of the object contained in a shot image to correspond to a preset size in a portable camera according to one embodiment of the present invention.

According to one embodiment of the present invention, the controller 180 may connect a communication with an external device satisfying a preset condition. If there exist a plurality of external devices satisfying the preset condition, the controller 180 can control a movement of the imaging unit 120 to take a shot for an object corresponding to the external device satisfying the preset condition among a plurality of the external device. If there is a single external device satisfying the specific condition, the controller 180 can control a movement of the imaging unit 120 to take a shot for an object corresponding to the external device satisfying the preset condition.

Meanwhile, referring to FIG. 19, the controller 180 may recognize a size of the object 300 in the currently taken image. The controller 180 may enlarge (zoom in) or reduce (zoom out) the object 300 in order the recognized size of the object 300 to correspond to a preset size.

For instance, the controller 180 may recognize a size of the object 300 in the taken image. Using the recognized size of the object 300, the controller 180 may recognize a rate occupied by the object in the image. In order to maintain the rate occupied by the object in the image, the controller 180 controls the imaging unit 120 to zoom in or out the object 300.

For another instance, the controller 180 may recognize a size of the object 300 in the taken image. The controller 180 may recognize whether the recognized size corresponds to a preset size. If recognizing that the recognized size corresponds to the preset size, the controller 180 may take the image as it is. Yet, if recognizing that the recognized size fails to correspond to the preset size, the controller 180 may control the imaging unit 120 to zoom in or out the object 300.

Method of Editing Video Received from External Device

According to one embodiment of the present invention, the portable camera 100 can receive a video of capturing the portable camera 100 from at least one communication connected external device. The controller 180 of the portable camera 100 can create a single video by editing at least one video received from the at least one external device. This is described in detail with reference to FIGS. 20 to 23.

Figure 20:
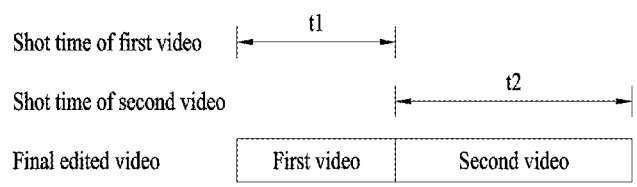
FIG. 20 is a diagram to describe one example of a method of editing an image using at least one image received from at least one external device in a portable camera according to one embodiment of the present invention.

FIG. 20 is a diagram to describe one example of a method of editing a video using at least one video received from at least one external device in a portable camera according to one embodiment of the present invention.

According to one embodiment of the present invention, the controller 180 may control the communication unit 110 to connect communication with at least one external device. The controller 180 may control the communication unit 110 to receive a video of taking a shot for an object (e.g., a user of the portable camera 100) corresponding to the portable camera 100 among the at least one external device.

Regarding the present embodiment, for clarity of the description, the following description is made on the assumption that the controller 180 receives a first video of taking a shot for the object and a second video of taking a shot for the object from a first external device and a second external device, respectively.

The controller 180 may recognize a shot time of the first video and a shot time of the second video. Using the shot times of the first and second videos, the controller 180 may create a final edited video.

For instance, referring to FIG. 20, the controller 180 may recognize that the shot time for taking the first video is a first time t1, that the shot time for taking the second video is a second time t2, and that the first time t1 and the second time t2 fail to overlap with each other. If recognizing that the first time t1 and the second time t2 fail to overlap with each other, the controller 180 may create a final edited video created from attaching the second video to an end of the first video. And, the controller 180 may save the final edited video to the memory 170.

Figure 21:
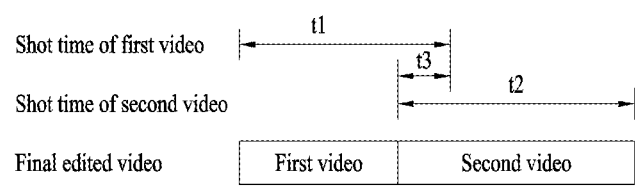
FIG. 21 is a diagram to describe another example of a method of editing an image using at least one image received from at least one external device in a portable camera according to one embodiment of the present invention.

FIG. 21 is a diagram to describe another example of a method of editing a video using at least one video received from at least one external device in a portable camera according to one embodiment of the present invention.

According to one embodiment of the present invention, the controller 180 may control the communication unit 110 to connect communication with at least one external device. The controller 180 may control the communication unit 110 to receive a video of taking a shot for an object (e.g., a user of the portable camera 100) corresponding to the portable camera 100 among the at least one external device.

Regarding the present embodiment, for clarity of the description, the following description is made on the assumption that the controller 180 receives a first video of taking a shot for the object and a second video of taking a shot for the object from a first external device and a second external device, respectively.

The controller 180 may recognize a shot time of the first video and a shot time of the second video. Using the shot times of the first and second videos, the controller 180 may create a final edited video.

For instance, referring to FIG. 21, the controller 180 may recognize that the shot time for taking the first video is a first time t1, that the shot time for taking the second video is a second time t2, and that the first time t1 and the second time t2 overlap with each other by a third time t3.

First of all, the controller 180 may edit the first video to be played during the first time t1 not overlapping with the second time t2. And, the controller 180 may edit the second video to be played during the second time t2 not overlapping with the first time t1.

Meanwhile, if recognizing that the first time t1 and the second time t2 overlap with each other by the third time t3, the controller 180 may edit a video so that a video satisfying a preset condition, which is selected from the first video and the second video, can be played during the third time t3.

For instance, when receiving the first video and the second video, the controller 180 may receive a first information on a shot place of taking the first video and a second information on a shot place of taking the second video as well. Comparing the first information and the second information with each other, the controller 180 may recognize that the second video is taken at a closer location. In this case, the controller 180 may edit the video so as to play the second video during the third time t3.

For another instance, the controller 180 analyzes images in the first and second videos, thereby recognizing a video in which a face of an object contained in the video looks better. If recognizing that the video containing the better-looking face of the object is the second video, the controller 180 may edit the video so as to play the second video during the third time t3. Herein, algorithm for recognizing a video having a better-looking face of the object may be stored in the memory 170 in advance.

For further instance, the controller 180 analyzes images in the first and second videos, thereby recognizing a video in which a background contained in the video looks better. If recognizing that the video containing the better-looking background is the second video, the controller 180 may edit the video so as to play the second video during the third time t3. Herein, algorithm for recognizing a video having a better-looking background may be stored in the memory 170 in advance.

Namely, the controller 180 can create the final edited video that is played in a manner of playing the first video in the first place, playing the video satisfying a preset condition, which is selected from the first video and the second video, during the third time t3, and then playing the third video.

According to an embodiment, the controller 180 can create the final edited video containing an indicator indicating that another video exists during the third time t3. Namely, the indicator may be displayed on a prescribed region of a screen while the final edited video is played during the third time t3.

According to an embodiment, the controller 180 can create the final edited video so that the first video can be displayed in PIP (picture-in-picture) together while the final edited video is played during the third time t3. Namely, while the final edited video is played during the third time t3, the first video and the second video can be played together.

Figure 22:
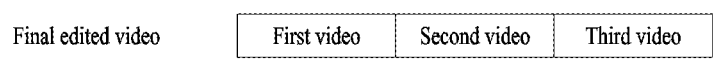
FIG. 22 is a diagram to describe further example of a method of editing an image using at least one image received from at least one external device in a portable camera according to one embodiment of the present invention.

FIG. 22 is a diagram to describe further example of a method of editing an image using at least one image received from at least one external device in a portable camera according to one embodiment of the present invention.

According to one embodiment of the present invention, the controller 180 may control the communication unit 110 to connect communication with at least one external device. The controller 180 may control the communication unit 110 to receive a video of taking a shot for an object (e.g., a user of the portable camera 100) corresponding to the portable camera 100 among the at least one external device.

Regarding the present embodiment, for clarity of the description, the following description is made on the assumption that the controller 180 receives a first video of taking a shot for the object, a second video of taking a shot for the object and a third video of taking a shot for the object from a first external device, a second external device and a third external device, respectively. And, the following description is also made on the assumption that a shot time of taking each of the first to third videos is equal.

The controller 180 may create a final edited video using the first to third videos.

For instance, referring to FIG. 22, the controller 180 can create the final edited video so that the first to third videos can be played in order.

For another instance, when receiving the first to third videos, the controller 180 can receive shot location informations of the respective videos as well. Using the shot location informations of the respective videos, the controller 180 can create the final edited video so that the first to third videos can be played in order of shot at closer location.

For further instance, the controller 180 can create the final edited video so that the first to third videos can be played in order of a video satisfying a preset condition. For instance, if the preset condition is to sequentially dispose a video having a better-looking background, a video having a better-looking face of the object, and the video having the better-looking background, the controller 180 can create the final edited image in a manner of disposing the first video, the second video and the third video in order of the video satisfying the preset condition.

Meanwhile, according to an embodiment, the controller 180 can create a video for observing the object at various angles by synthesizing all the first to third videos together.

Figure 23A:
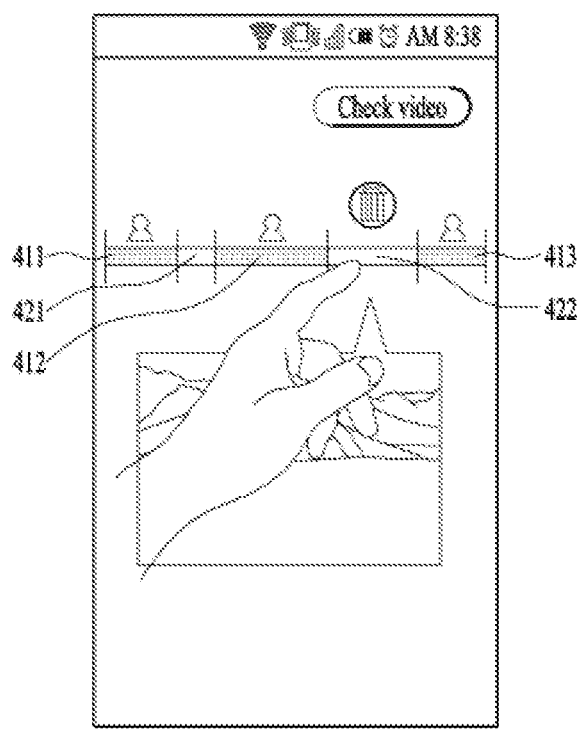
FIGS. 23A and 23B are diagrams to describe one example of a method of editing an image captured by a portable camera in an external device according to one embodiment of the present invention.
Figure 23B:
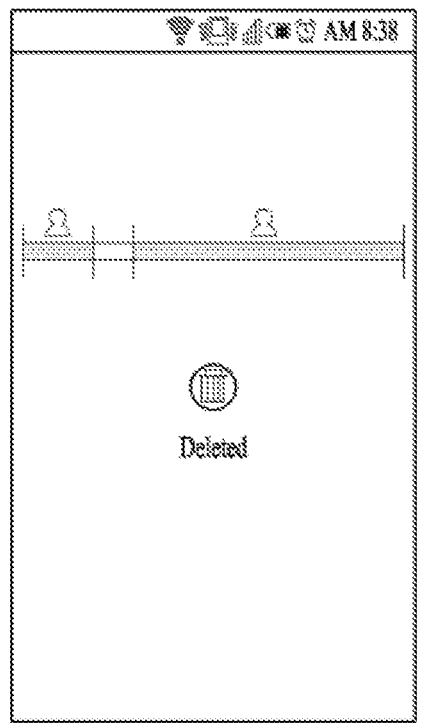

FIGS. 23A and 23B are diagrams to describe one example of a method of editing an image captured by a portable camera in an external device according to one embodiment of the present invention.

According to one embodiment of the present invention, the portable camera 100 can take a video shot for an object corresponding to a specific one of at least one or more external devices. And, the portable camera 100 can send the taken video to the specific external device.

Referring to FIG. 23A, when displaying a screen for checking the received video, a controller of the specific external device analyzes the taken video, thereby recognizing time regions 411 to 413 having the object exist therein and time regions 421 and 422 having the object not exist therein. The controller of the specific external device can display indicators indicating the object existing time regions 411 to 413 and indicators indicating the object not-existing time regions 421 and 422 on the screen.

If detecting a command for deleting a specific one 422 of the object not-existing time regions 421 and 422, as shown in FIG. 23B, the controller of the specific external device can delete the video of the specific time region 422 from the received video.

According to at least one of the aforementioned embodiments of the present invention, a shot can be taken in a manner of connecting a communication with an external device satisfying a preset condition and then tracking a movement of a user of the communication connected external device. If communications with a plurality of external devices are connected, a shot can be taken in a manner of recognizing an external device satisfying a specific condition among a plurality of the external devices and then tracking a user of the recognized external device only. If the external device satisfying the specific condition among a plurality of the external devices is changed, a shot can be taken in a manner of tracking a user of the changed external device. And, an image containing an object satisfying a preset condition can be automatically transmitted to an external device corresponding to the object.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

INDUSTRIAL APPLICABILITY

The present invention relates to a portable camera and a method for controlling the same. Therefore, the present invention has industrial applicability.

What is claimed is:

1. A portable camera, comprising:
a transceiver;
a camera configured to take an image; and
a controller configured to:
control the transceiver to connect a communication with a first external device satisfying a preset condition,
control a movement of the camera to take a shot for a first object corresponding to the first external device,
control the transceiver to send an image of taking the shot for the first object to the first external device,
recognize, in the image of the first object, a size of the first object during taking of the shot for the first object, and
based on a determination that the recognized size does not correspond to a preset size, control the camera to zoom in or out to cause an image size of the first object to correspond to the preset size.

2. The portable camera of claim 1, wherein the controller is further configured to:
control the transceiver to connect a communication with a second external device satisfying the preset condition,
recognize an external device satisfying a specific condition among the first external device and the second external device, and
control the movement of the camera so as to take a shot for an object corresponding to the recognized external device.

3. The portable camera of claim 2, wherein the controller is further configured to:
if recognizing that the external device satisfying the specific condition is the second external device during taking the shot for the first object, control the movement of the camera to take a shot for a second object corresponding to the second external device, and
control the transceiver to send the image of taking the shot for the second object to the second external device.

4. The portable camera of claim 2, further comprising a location information unit configured to recognize a current location information of the portable camera,
wherein the controller is further configured to control the transceiver to receive a location information from each of the first external device and the second external device.

5. The portable camera of claim 4, wherein the controller is further configured to recognize an external device located in a distance closest to the portable camera as the external device satisfying the specific condition using the current location information and the received location information.

6. The portable camera of claim 4, further comprising a sensor configured to sense an externally generated sound,
wherein the controller is further configured to:
recognize a direction in which the sensed sound is generated, and
recognize an external device located in the recognized direction as the external device satisfying the specific condition using the current location information and the received location information.

7. The portable camera of claim 4, wherein the controller is further configured to recognize an external device located in a distance closest to the portable camera among movement sensed external devices as the external device satisfying the specific condition using the current location information and the received location information.

8. The portable camera of claim 4, further comprising a sensor configured to sense a direction faced by a front side of the portable camera,
wherein the controller is further configured to recognize an external device located in the sensed front direction as the external device satisfying the specific condition using the current location information and the received location information.

9. The portable camera of claim 1, further comprising an input unit configured to sense an input for a preset time,
wherein transceiver receives a specific signal from at least one external device, and
wherein the first external device satisfying the preset condition comprises the external device having sent the specific signal within the preset time among the at least one external device.

10. The portable camera of claim 1, wherein the external device is a portable camera.

11. The portable camera of claim 1, wherein the external device is one of a plurality of wearable devices including a smart watch, a smart glass, and a head mounter display (HMD).

12. The portable camera of claim 1, wherein the controller is further configured to:
based on a recognition of a percentage of the first image occupied by the first object, control the camera to zoom in or out to maintain the rate.

13. The portable camera of claim 1, wherein the controller is further configured to:
receive, through the transceiver and from the first external device, a video of capturing an object corresponding to the portable camera, and
create a single video by editing the video received from the first external device with video captured by the camera.

14. The portable camera of claim 1, wherein the controller is further configured to:
receive, through the transceiver and from the first external device, a first video of taking a shot for the object, and
create a single video by editing the first video received from the first external device with the image of the first object.

15. The portable camera of claim 1, wherein the controller is further configured to:
receive, through the transceiver and from the first external device, a first video of taking a shot for the object,
receive, through the transceiver and from a second external device, a second video of taking a shot for the object, and
create a single video by editing the first video received from the first external device with the second video received from the second external device.

16. The portable camera of claim 15, wherein the controller is configured to create the single video by recognizing a first shot time of the first video and a second shot time of the second video and using the first shot time and the second shot time to create the single video.

17. The portable camera of claim 16, wherein the controller is configured to use the first shot time and the second shot time to create the single video by recognizing that the first shot time and the second shot time do not overlap and, based on the recognition that the first shot time and the second shot time do not overlap, creating the single video by appending the second video to the first video.

18. The portable camera of claim 16, wherein the controller is configured to use the first shot time and the second shot time to create the single video by recognizing that the first shot time and the second shot time overlap with each other for a third time and, based on the recognition that the first shot time and the second shot time overlap for the third time, creating the single video by using the first video for a portion of the first time that does not overlap with the third time, using the second video for a portion of the second time that does not overlap with the third time, and selecting one of the first or second video to use for the third time.

19. The portable camera of claim 18, wherein the controller is configured to select one of the first or second video to use for the third time by determining that, at the third time, the second external device was closer to a location of the object than the first external device and, based on the determination that, at the third time, the second external device was closer to a location of the object than the first external device, selecting the second video to use for the third time.

20. The portable camera of claim 18, wherein the controller is further configured to include, in the single video, an indicator indicating that another video exists during the third time.

\* \* \* \* \*